United States Patent [19]

Tamaki et al.

[11] Patent Number: 5,396,603
[45] Date of Patent: Mar. 7, 1995

[54] DATA PROCESSOR HAVING RESOURCES AND EXECUTION START CONTROL FOR STARTING EXECUTION OF SUCCEEDING INSTRUCTION IN RESOURCE BEFORE COMPLETION OF PRECEDING INSTRUCTION

[75] Inventors: Yoshiko Tamaki, Kunitachi; Shigeko Yazawa, Hadano, both of Japan; Yasuhiro Inagami, Manchester, England; Katsuyoshi Kitai, Kokubunji, Japan

[73] Assignee: Hitachi, Ltd., Tokyo, Japan

[21] Appl. No.: 634,810

[22] Filed: Dec. 31, 1990

Related U.S. Application Data

[63] Continuation of Ser. No. 269,645, Nov. 10, 1988, abandoned.

[30] Foreign Application Priority Data

Nov. 13, 1987 [JP] Japan ............................ 62-285310

[51] Int. Cl.⁶ .............................................. G06F 9/38
[52] U.S. Cl. .................................. 395/375; 364/231.8; 364/232.21; 364/262.5; 364/263; 364/DIG. 1; 364/931.51; 364/946.3; 364/948.3; 364/948.34
[58] Field of Search ........................ 395/800, 375, 650; 364/736

[56] References Cited

U.S. PATENT DOCUMENTS

| | | | |
|---|---|---|---|
| 3,593,300 | 7/1971 | Driscoll et al. | 364/200 |
| 3,614,745 | 10/1971 | Podrin | 364/200 |
| 3,631,452 | 12/1971 | Richard | 340/309.5 |
| 3,702,006 | 10/1972 | Page | 395/650 |
| 4,110,822 | 8/1978 | Porter et al. | 395/375 |
| 4,384,324 | 5/1983 | Kim et al. | 364/200 |
| 4,403,286 | 9/1983 | Fry et al. | 364/200 |
| 4,495,562 | 1/1985 | Yamaji et al. | 364/200 |
| 4,495,570 | 1/1985 | Kitajima et al. | 364/200 |
| 4,517,641 | 5/1985 | Pinherio | 364/200 |
| 4,521,851 | 6/1985 | Trubisky et al. | 364/200 |
| 4,532,589 | 7/1985 | Shintani et al. | 395/375 |
| 4,617,625 | 10/1986 | Nagashima et al. | 395/800 |
| 4,621,359 | 11/1986 | McMillen | 370/60 |
| 4,627,018 | 12/1986 | Trost et al. | 364/900 |
| 4,658,355 | 4/1987 | Hatakiyama et al. | 364/200 |
| 4,663,730 | 5/1987 | Ikeda | 364/900 |
| 4,685,058 | 8/1987 | Lee et al. | 395/375 |
| 4,760,520 | 7/1988 | Shintani et al. | 395/375 |
| 4,809,157 | 2/1989 | Eilert et al. | 395/650 |
| 4,849,882 | 7/1989 | Aoyama et al. | 364/200 |
| 4,852,001 | 7/1989 | Tsushima et al. | 364/401 |
| 5,073,970 | 12/1991 | Aoyama et al. | 395/800 |
| 5,185,870 | 2/1993 | Lenoski | 395/375 |

*Primary Examiner*—Thomas G. Black
*Assistant Examiner*—Paul Harrity
*Attorney, Agent, or Firm*—Antonelli, Terry, Stout & Kraus

[57] ABSTRACT

A data processor having memory requesters to execute instructions, an instruction hold unit disposed for each resource to hold an instruction being executed in the resource and instructions to be executed therein, and execution control units to cause, in a case where an execution completion report of an instruction being executed in either one of the resources is received, an instruction held in an instruction hold unit corresponding to the resource to be immediately executed, thereby successively supplying the respective resources with data items to be employed for executions of the consecutive instructions in the resources.

27 Claims, 9 Drawing Sheets

FIG. 3
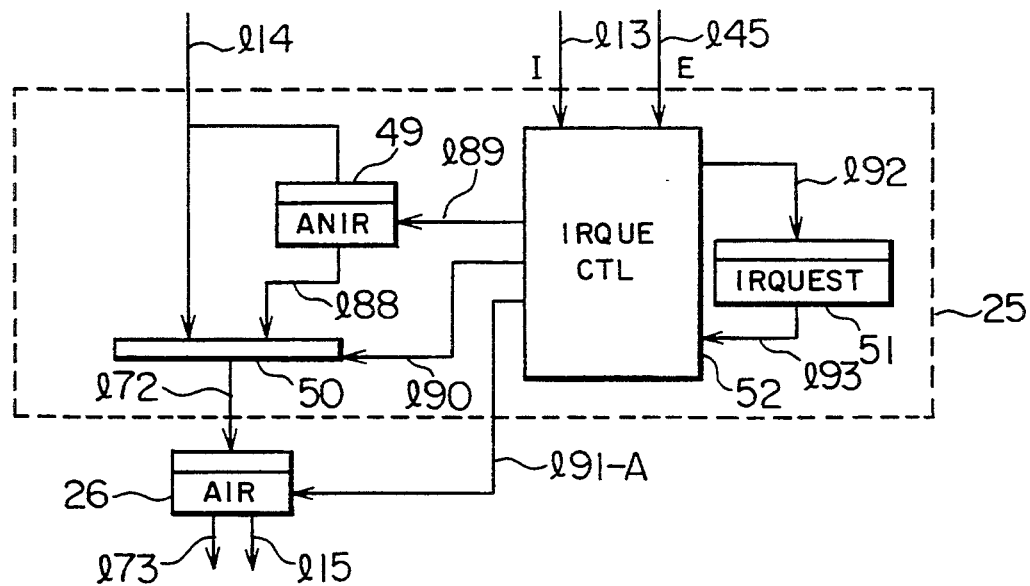
FIG. 4
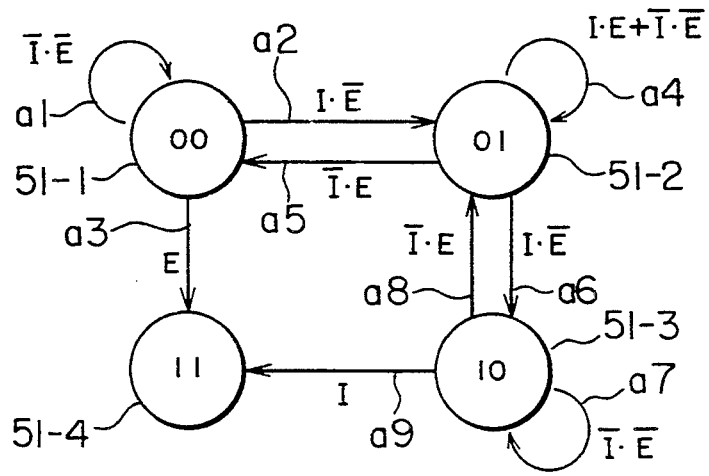
FIG. 5
| IRQUEST(ℓ93) | 00 | 01 | 01 | 10 |
|---|---|---|---|---|
| I (ℓ13) | 1 | 1 | 1 | 0 |
| E (ℓ45) | 0 | 0 | 1 | 1 |
| ℓ91 | 1 | 0 | 1 | 1 |
| ℓ89 | 0 | 1 | 1 | 0 |
| ℓ90 | 0 | 0 | 1 | 1 |

DATA PROCESSOR HAVING RESOURCES AND EXECUTION START CONTROL FOR STARTING EXECUTION OF SUCCEEDING INSTRUCTION IN RESOURCE BEFORE COMPLETION OF PRECEDING INSTRUCTION

This application is a continuation of application Ser. No. 269,645, filed on Nov. 10, 1988, now abandoned.

BACKGROUND OF THE INVENTION

The present invention relates to a data processor, and in particular, to a data processor or a vector processor suitable for executing vector operations at a high speed.

In a vector processor, in order to achieve at a high speed a matrix computation frequently appearing in a scientific and technological computation, there are disposed a plurality of memory requesters and arithmetic units (to be collectively referred to as resources herebelow) formed in a pipeline configuration in which vector data can be supplied for each clock. Furthermore, in many cases, in order to temporarily store data supplied from such resources and to supply data thereto at a high speed, the vector processor includes a plurality of vector registers in which read and write operations of vector data can be effected for each clock.

In U.S. Pat. No. 4,658,355 a system is shown in which even when information items such as operation codes corresponding to the kinds of arithmetic operations to be effected are shifted in synchronism with a stage of a pipeline such that the respective stages of operations are controlled so as to effect a plurality of different kinds of operations, an if control informations such as the operation codes are supplied to one of resources such as memory requesters and arithmetic units as described above without intervals therebetween, vector data items processed by the specific operations can be accepted by the resource without intervals therebetween.

On the other hand, the U.S. Pat. No. 4,617,625 has disclosed a system in which in order to supply or to receive data items to or from a resource without intervals therebetween, a control unit controlling vector registers effects a change-over operation for a data transfer path between a resource for which an instruction is to be effected and a vector register specified for a read or write operation by the instruction such that the change-over operation is achieved immediately after a result of a decode operation of the instruction is supplied thereto so as to instruct the data read or write operation.

The result of the decode operation is supplied from an instruction control unit. In the instruction control unit, an instruction is decoded so as to determine whether or not an execution of the decoded instruction can be initiated. If the execution can be initiated, the result of the instruction decode operation is immediately sent to the resource and the vector register control unit; otherwise, after the state in which the instruction can be executed is established, the operation above is achieved. The state in which the execution of the instruction can be initiated means that the resource as an object of the execution of the instruction is not in use and the vector register specified for the read or write operation by the instruction is available for the pertinent operation.

The control method above is described in detail in U.S. Pat. No. 4,617,625.

In the above prior art technologies, a completion report or notification of an instruction execution indicating an end of a use of a resource is transmitted when the last vector data to be processed by the instruction being executed is supplied to the resource. In consequence, there is required a period of time from when the vector data to be processed by the instruction being executed is supplied to the resource to a point of time when the resource is loaded with the first vector data of the next instruction for which the initiation of the execution is determined to be possible as a result of the execution initiation possibility check effected on arrival of the instruction execution completion report in the instruction control unit and which is notified to the resource and the vector register control unit. As a result, conventionally, even if the resources and the vector register control unit are so configured to effect processing of vector data for each clock, there is elapsed a period of time from when the last vector data of the preceding instruction is processed to when processing of the first vector data of the succeeding instruction is effected, which as a result deteriorates the utilization efficiency, for example, of the resource.

SUMMARY OF THE INVENTION

It is therefore an object of the present invention to provide a data processor in which vector data items to be processed by the consecutive instructions can be supplied to the respective resources without any interval therebetween.

According to the present invention, when the last vector data items to be used by the preceding instruction are respectively supplied to the pertinent resources, the next instruction is immediately effected or supplied for the resource and the vector register control unit, thereby supplying the vector data items to the resources without any interval therebetween. As a result, according to the present invention, in the instruction execution control unit effecting control operations on the resources and vector registers, there is disposed instruction hold means for each resource to store or to hold an instruction which is other than the instruction currently in execution for the resource and of which the execution can be initiated by use of the resource when the execution of the instruction is completed. The instruction hold means are controlled such that when the instruction in execution for the resource is finished, one of the instructions which have been held in the hold means and of which the execution can be initiated is immediately supplied to the resource and the vector register control unit. In addition, the instruction control unit checks to determine whether or not a vector register specified for the read or write operation in the decoded instruction is available for the pertinent operation and to determine whether or not the instruction hold means corresponding to the resource used by the decoded instruction is capable of further holding another instruction. Only when the register is available and the hold means can hold another instruction of which the execution can be initiated, the instruction control unit judges that the execution of the instruction can be started so as to instruct the instruction hold means to hold the decoded instruction.

In addition, when viewed from the instruction control unit, the instructions which are instructed to be held in the instruction hold means seem to be in execution for the pertinent resources. That is, the instruction control unit assumes the vector register specified for the read or write operation by the instruction to be set to use for the read or write operation when the operation to hold the instruction is issued to the instruction hold means, thereby judging to determine whether or not the registers associated with the next instruction are available.

Furthermore, in a case where there exist a plurality of resources for which an instruction is executable, the instruction control unit forecasts to determine the points of time when the executions of the instructions held in the instruction hold means for the respective resources are finished such that the operation to hold the instruction is effected by selecting one of the resources for which the execution is determined to be completed at the earliest point of time.

The methods to forecast the points of time when the executions of the instructions held in associated with the respective resources are completed are as follows.

(1) For a resource having the smaller number of instructions held for the resource, the execution of the instruction is assumed to be earlier completed.

(2) In a case where the same number of instructions are held for the resources, for an instruction of which the initiation of the execution is reserved earlier, the execution of the instruction is assumed to be earlier completed.

(3) In a case where the same number of instructions are held for the resources, for an instruction which earlier enters in execution, the execution of the instruction is assumed to be earlier completed.

(4) In a case where the same number of instructions are held for the resources, for an instruction which has a smaller number of vector elements, the execution of the instruction is assumed to be earlier completed.

The method 1 above can be achieved by disposing for each resource a circuit to store the number of instructions held in the hold means and a circuit for effecting a comparison between the numbers of the instructions.

In order to achieve the method 2 above, there is disposed, in addition to the circuits for the method 1, a circuit to record, for each reservation for the initiation of the execution of an instruction, the condition that the initiation has been reserved.

In order to achieve the method 3 above, there is disposed for each resource, in addition to the circuits for the method 1, a circuit to record, each time an instruction held to wait for an execution is set to the execution, the condition that the execution has been started.

In order to achieve the method 4 above, there is disposed for each resource, in addition to the circuits for the method 1, a circuit to compare the number of unprocessed vector elements of the resources each time a vector element is processed in the resource.

For the methods above, the amount of circuits required to accomplish the forecast operation is increased in the order of methods 1, 2, 3, and 4, and the precision of the forecast is also increased in this order.

In addition, in a case where the first resource can execute instructions of the first and second kinds and the second resource can execute instructions of the first kind and cannot execute instructions of the second kind, if it is forecasted that the same execution completion time is assumed for the instructions respectively held in the instruction hold means respectively corresponding to the first and second resources, the instruction control unit instructs the second resource to hold the instruction of the first kind.

That the instruction control unit instructs the instruction hold means associated with the respective resources to hold an instruction for which an initiation of execution is possible means that the execution of the instruction is reserved for the resource and the vector register control unit. In consequence, herebelow, an operation to instruct the means to hold an instruction is referred to as a reservation of an execution start of an instruction. Moreover, the instruction hold means disposed for each resource to hold an instruction for which an execution start is possible is called a reserve means, whereas the instruction held in the reserve means is called an execution start reserved instruction.

As described above, there is disposed in the instruction execution controller reserve means for each resource to reserve an instruction for which an execution start thereof is possible, and when the last vector data to be processed by an instruction currently in execution is supplied to the resource, an instruction to be next executed is immediately supplied to the resource and the vector register control unit. As a result, the vector data items to be respectively used by the preceding instruction and the succeeding instruction are supplied to the respective resources without causing a free stage to appear in the pipeline of the resource, which therefore increases the utilization efficiency of the resource. In addition, the instruction control unit reserves the result of the decode operation to the reserve means disposed for each resource only when the vector register for which a read or write operation is specified by the decoded instruction is available for the read or write operation; consequently, there does not occur any inconsistency even when the vector register control unit immediately reads or writes the vector data, on receiving the result of the decode operation, from or in the specified vector register.

In addition, when there exist a plurality of resources in which an instruction can be executed, in order to initiate the execution of the instruction as early as possible, the instruction control unit forecasts the point of time of the completion of execution of each instruction held in association with each resource such that a reserve instruction is issued to the reserve means for which the execution of an instruction is to be earliest completed. In addition, at an attempt for a reserve instruction of the first instruction, if it is forecasted that the same execution completion time is assumed for the reserved instructions respectively held in the reserve means respectively associated with the first and second resources which can execute the first instruction and the first resource can execute the instructions of the second kind which cannot be executed by the second resource, the reserve instruction is effected for the second resource. As a result, when a check is achieved to determine whether or not a reservation of an execution start is possible for the second instruction, the opportunity in which the reservation is determined to be possible is increased as compared with the case where the control above is not achieved.

According to the present invention, when an instruction in execution in a resource is completed, the next executable instruction is enabled to be immediately supplied to the resource and the vector register control unit. As a result, the vector data items to be respectively processed by the preceding and succeeding instructions can be supplied to the respective resources in a successive fashion, which therefore increases the utilization efficiency of the resource.

BRIEF DESCRIPTION OF THE DRAWINGS

These and other objects and advantages of the present invention will become apparent by reference to the following description and accompanying drawings wherein:

FIG. 3 is a configuration diagram of an instruction execution start control unit;

FIG. 4 is a state transition diagram showing transition of the value in the reserved instruction hold state indicate register;

FIG. 5 is a table showing values to be set to signals in the instruction execution start control unit;

DESCRIPTION OF THE PREFERRED EMBODIMENTS

Figure 1:
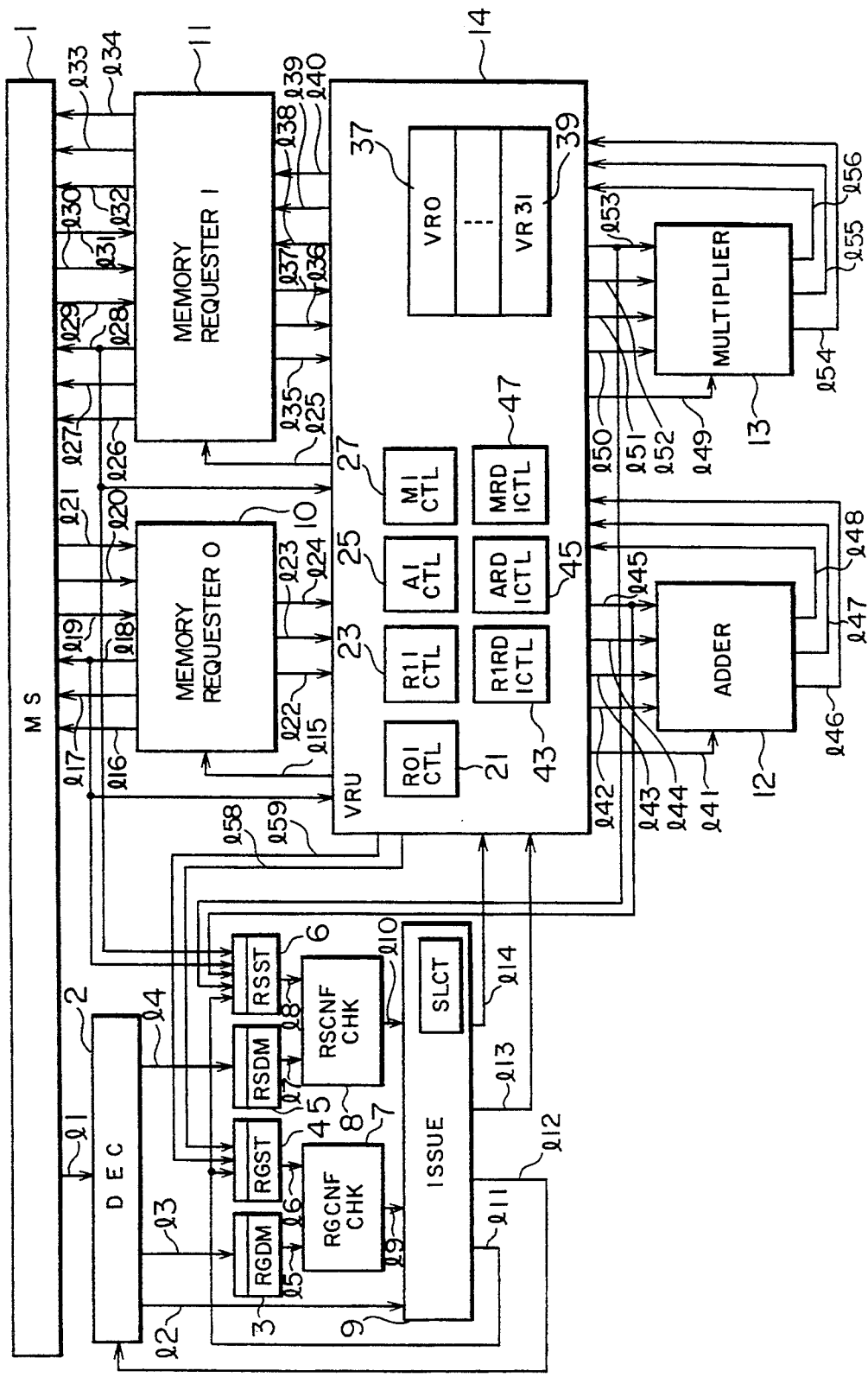
FIG. 1 is a schematic configuration diagram of an embodiment of a data processor according to the present invention.

Referring now to the accompanying drawings, description will be given of embodiments of the present invention. FIG. 1 schematically shows a configuration of a data processor as an embodiment according to the present invention.

The configuration of FIG. 1 includes a main memory 1, an instruction decode unit 2, and an instruction issue unit 9 to issue a reserve signal associated with an instruction execution start. The instruction issue unit 9 includes therein a resource select mechanism, which will be described in detail later in this text. The system of FIG. 1 further comprises a memory requester (0) 10, a memory requester (1) 11, an adder 12, a multiplier 13, and a vector register unit 14. The vector register unit 14 includes therein vector registers, reserve means disposed for each resource to reserve instructions for which the execution start is possible, and an instruction execution start control unit (to be denoted as ICTL in the figure) to control the reserve means, which will be described in detail later.

The instruction decode unit 2 receives via a signal line 11 a vector instruction fetched from the main memory 1 under control of an instruction fetch unit (not shown) so as to decode the vector instruction into such information items necessary for an execution thereof as an operation code indicating a kind of an arithmetic operation to be achieved, a vector register number employed to a read or write operation, and a resource number to be used. The instruction decode unit 2 then sends the information items via a signal line 12 to the instruction issue unit 9 and sets the vector register number and the resource number to be employed in the execution of the instruction via signal lines 13 and 14 to a register read/write request hold register (RGDM) 3 and a resource use request hold register (RSDM) 5, respectively. In this embodiment, it is assumed that the resources include the memory requester 10, the memory requester 11, the adder 12, and the multiplier 14, which are respectively assigned with resource numbers 0 to 3 in this sequence. Furthermore, it is assumed that 32 vector registers assigned with reference numerals 0 to 30 are used.

In FIG. 1, reference numeral 4 denotes a register use state hold register (RGST), which holds, for each vector register, a state designating whether or not the register is being used for a read or write operation. The configuration further comprises a resource reservation state hold register (RSST) 6 indicating, for each resource, the number of execution start reserved instructions held therein, which will be described in detail later.

The register availability judge unit (RGCNFCHK) 7 receives respectively through signal lines 15 and 16 information items held in the register read/write request hold register 3 and the register use state hold register 4 so as to determine whether or not a vector register to be used for a read or write operation in the decoded instruction is available for each clock, thereby transmitting a result of the judgement via a signal line 9. The judge method of judging the register availability has been described in detail in the U.S. Pat. No. 4,617,625 and hence will not be described in this text.

The resource availability judge unit (RSCNFCHK) 8 receives respectively via signal lines 17 and 18 information items held in the resource use request hold register 5 and the resource reservation state hold register 6 so as to determine, for each clock, whether or not an instruction execution start can be reserved for the resource to which the decoded instruction is to be executed, thereby sending a result of the judgement via a signal line 110 to the instruction issue unit 9, which will be described in detail later.

The instruction issue unit 9 effects the following operation when positive results are attained from the register availability judgement and the resource availability judgement, respectively.

That is, the information items necessary for the instruction execution such as an operation code, a vector length, and a vector register number to be used are delivered via a signal line 114 to the vector register unit 14 and a resource to which the instruction is to be executed is selected such that a reservation number of an instruction execution start for the instruction execution start control unit corresponding to the resource in the vector register unit 14 is issued via a signal line 113. In addition, the contents of the vector register employed in the instruction of which the execution start has been reserved, the register use state hold register 4 related to the resource, and the resource reservation state hold register 6 are updated through a signal line 111. Moreover, the completion of the execution start reservation for the instruction is notified via a signal line 112 to the instruction decode unit 2, which sends, on receiving the notification of the instruction execution start reservation, the result of the decode operation of the next vector instruction to the signal lines 12, 13, and 14.

The instruction issue unit 9 does not issue, in a case where at least either one of the results of the register availability judgement and the resource availability judgement is negative, any signal to the signal lines 111 to 114. In consequence, the instruction decode unit 2 does not transmit the decoded result of the instruction onto the signal lines 12, 13, and 14 and hence the contents of the register read/write request hold register 3 and the resource use request hold register 5 are not changed. On the other hand, the contents of the register use state hold register 4 and the resource reservation state hold register 6 are updated respectively via signal lines 158 and 159 and signal lines 118, 128, 145, and 153 when the execution of the instruction is finished. The register availability judge unit 7 and the resource availability judge unit 8 effect availability judgement of the register and the resource for each clock, and when both of the judgement results are positive, the instruction issue unit 9 achieves the instruction execution start reservation.

The information items necessary for the execution of the instruction such as the operation code, the vector register, and the vector register number to be used are delivered via the signal line 114 to the vector register unit 14. The vector register unit 14 sends the information items including the operation code and the vector length via the signal lines 115, 125, 141, and 149 to the resources 10, 11, 12, and 13, respectively. The resources 10 to 13 respectively achieve the instructions supplied through the specific signal lines.

Next, description will be briefly given of the operations of the respective resources.

The memory requester 10 reads a main memory read instruction indicated on the signal line 115. The main memory read instruction is an instruction which reads vector data from the main memory 1 and then stores the data in a vector register. Furthermore, the contents received by the memory requester 10 through the signal line 115 include an operation code designating the kind of the instruction to be executed, a number of an address register (not shown) to be employed to generate an address in the instruction, and a vector length.

The memory requester 10, by using information contained in the address register specified by the instruction, sequentially generates an address of the vector data in the main memory 1 and sends the address having a vector length indicated on the signal line 115 and an address validity signal indicating that the address is valid from the main memory control unit (not shown) via the signal lines 116 and 117 to the main memory 1. The operation to read data from the main memory 1 may be intermittently achieved due to an address contention and a read path contention associated with the main memory 1; however, when moving data, the data validity signal denoting the validity of the data is transmitted in any case such that the instruction execution control is accomplished according to the data validity signal. The vector data thus read from the main storage 1 is sent together with the data validity signal via the signal lines 119 and 120 to the memory requester 10, which in turn transmits the signal via the signal lines 122 and 123 to the vector register unit 14. Only when the validity signal of the data is 1, the vector register 14 writes the vector data received via the signal line 122 in a vector register specified for the instruction being executed in the memory requester 10. When transmitting an address validity signal 117 for the last vector data to be processed by the vector instruction designated by the signal line 115, the memory requester 10 also sends the address last signal 118. When the last vector data to be used in the vector instruction indicated by the signal line 115 is read from the main memory 1, together with the validity signal 120 of the vector data, the data last signal 121 is also transmitted; furthermore, the vector register unit 14 is also supplied with the signal 121 via the signal line 124 as well as via the signal line 123 at the same time.

The address last signal 118 is also sent to the vector register unit 14, which immediately changes over the content of the signal line 115, on receiving the signal 118, to an instruction to be executed in the memory requester 10.

The memory requester 10 receives information items such as an operation code indicated on the signal line 115 for each clock so as to move the information items in synchronism with the pipeline stage of the memory requester, thereby controlling the respective stages. In consequence, even when a valid instruction existing on the signal line 115 is switched to another valid instruction without any interval therebetween, the memory requester 10 generates addresses of the data items respectively processed by the specific instructions without any interval therebetween and then starts transmitting the addresses to the main memory 1.

Furthermore, the address last signal 118 is also sent as a signal notifying the completion of the execution of the vector instruction in the memory requester 10 to the resource reservation state hold register 6, thereby updating the content of the resource reservation state hold register 6.

The memory requester 11 executes a main memory read instruction or a main memory write instruction presented on the signal line 125. The main memory write instruction is an instruction to read vector data from a vector register and then to write the data in the main memory 1. In addition, the contents received by the memory requester 11 via the signal line 125 include an operation code indicating the kind of an instruction to be executed, the number of an address register to be used, and a vector length.

In a case where a main storage read instruction is achieved, the memory requester 11 sequentially generates a main memory address of the vector data thus read out by use of information contained in the address register specified by the instruction so as to send the address, the validity signal for the address, and the last signal of the address via the signal lines 126, 127, and 128 to the main memory 1. The vector data read from the main memory 1 is transmitted, together with the data validity signal and the data last signal, via the signal lines 129, 130, and 131 to the memory requester 11, which then sends these signals via the signal lines 135, 136, and 137 to the vector register unit 14. Only when the validity signal of the data is 1, the vector register unit 14 writes the vector data received via the signal line 135 in the vector register specified for the instruction being executed in the memory requester 11.

In a case where a main memory write instruction is executed, the memory requester 11 receives the write vector data, the data validity signal, and the data last signal via the signal line 138, 139, and 140 from the vector register unit 14. Only when the validity signal of the data is 1, the memory requester 11 sequentially generates an address of the main memory 1 where the data is to be written by use of the information contained in the address register, thereby transmitting the address, the validity signal of the address, and the address last signal of the address via the signal lines 132, 133, and 134 to the main memory 1.

Like in the case of the memory requester 10, even when a valid instruction on the signal line 125 is immediately switched to another valid instruction, the memory requester 11 can generate addresses of the data items processed by the respective instructions without any interval therebetween.

The address last signal 128 is also transmitted to the vector register 14, which in turn immediately switches the content on the signal line 125 to an instruction to be next executed in the memory requester 11; furthermore, in a case where the next instruction is a main memory write instruction, the vector register unit 14 starts transmitting the write vector data via the signal lines 138, 139, and 140 to the memory requester 11. The memory requester 11 immediately initiates transmitting an address of the vector data to be processed by the next vector instruction to the main memory 1.

In addition, the address last signal 128 is also sent as a signal notifying the completion of the vector instruction execution in the memory requester 11 to the resource reservation state hold register 6, thereby updating the content thereof.

The adder 12 executes an arithmetic instruction associated with an addition and indicated on the signal line 141. The arithmetic instruction is an instruction which effects the arithmetic operation between vector data items respectively read from two vector registers so as to store the result in a vector register. The content received by the adder 12 from the signal line 141 includes an operation code indicating the kind of an arithmetic operation to be executed.

The adder 12 effects an arithmetic operation between vector data items sent via two signal lines 142 and 143 from the vector register unit 14 and achieves, only when the validity signal 144 of the data is 1, the operation according to the operation code designated by the signal line 141 so as to send the data validity signal indicating the validity of the operation result to the signal line 147, thereby transmitting these information items to the vector register unit 14. When transmitting the validity signal 144 of the last vector data to be treated by the instruction effected in the adder 12, the vector register unit 14 simultaneously sends the data last signal 145. On receiving the data last signal 145, the adder 12 sends the validity signal of the last vector data items as well as the data last signal 148 at the same time.

The vector register unit 14, immediately after sending the data last signal 145, changes over the content of the signal line 141 to an instruction to be next executed in the adder 12 and at the same time initiates transmitting the read data to be handled by the instruction and the validity data of the read data to the signal lines 142, 143, and 144.

Like the memory requester 10, the adder 12 also receives the information items such as an operation code of an instruction indicated on the signal line 141 so as to move the information items in synchronism with the pipeline stage of the adder 12, thereby controlling the respective stages. In consequence, even when a valid instruction on the signal line 141 is changed over to a valid instruction designating another arithmetic operation without any interval therebetween, the vector data items to be processed by the respective instructions can be received from the signal lines 142 and 143 so as to effect the different arithmetic operations without causing any interval in each stage of the pipeline of the adder 12.

In addition, the data last signal 145 is also sent as a signal notifying the completion of the vector instruction execution in the adder 12 to the resource reservation state hold register 6, thereby updating the content thereof.

The multiplier 13 executes an arithmetic instruction related to a multiplication and indicated on the signal line 149. Although the arithmetic instruction to be achieved by the multiplier 13 is different from that of the adder 12, the operations of the multiplier 13 are nearly the same as those of the adder 12 described above.

That is, on receiving two vector data items, the validity signals of the data items, and the last signals thereof respectively sent from the signal lines 150, 151, 152, and 153 from the vector register unit 14, an arithmetic operation designated by the signal line 149 is achieved on two vector data items so as to send the operation result, the validity signal of the operation result, and the final signal thereof to the signal lines 154, 155, and 156, respectively. In addition, the final signal 153 of the read data sent from the vector register unit 14 is sent as a notification of the end of the instruction execution to the register reservation state display register 6 when the instruction execution is finished.

As described above, if the instruction to be executed and the read vector data can be received from the vector register unit 14 without any interval therebetween, each resource can successively execute the processing without causing any interval in the respective stages of the pipeline.

VECTOR REGISTER UNIT

Figure 2:
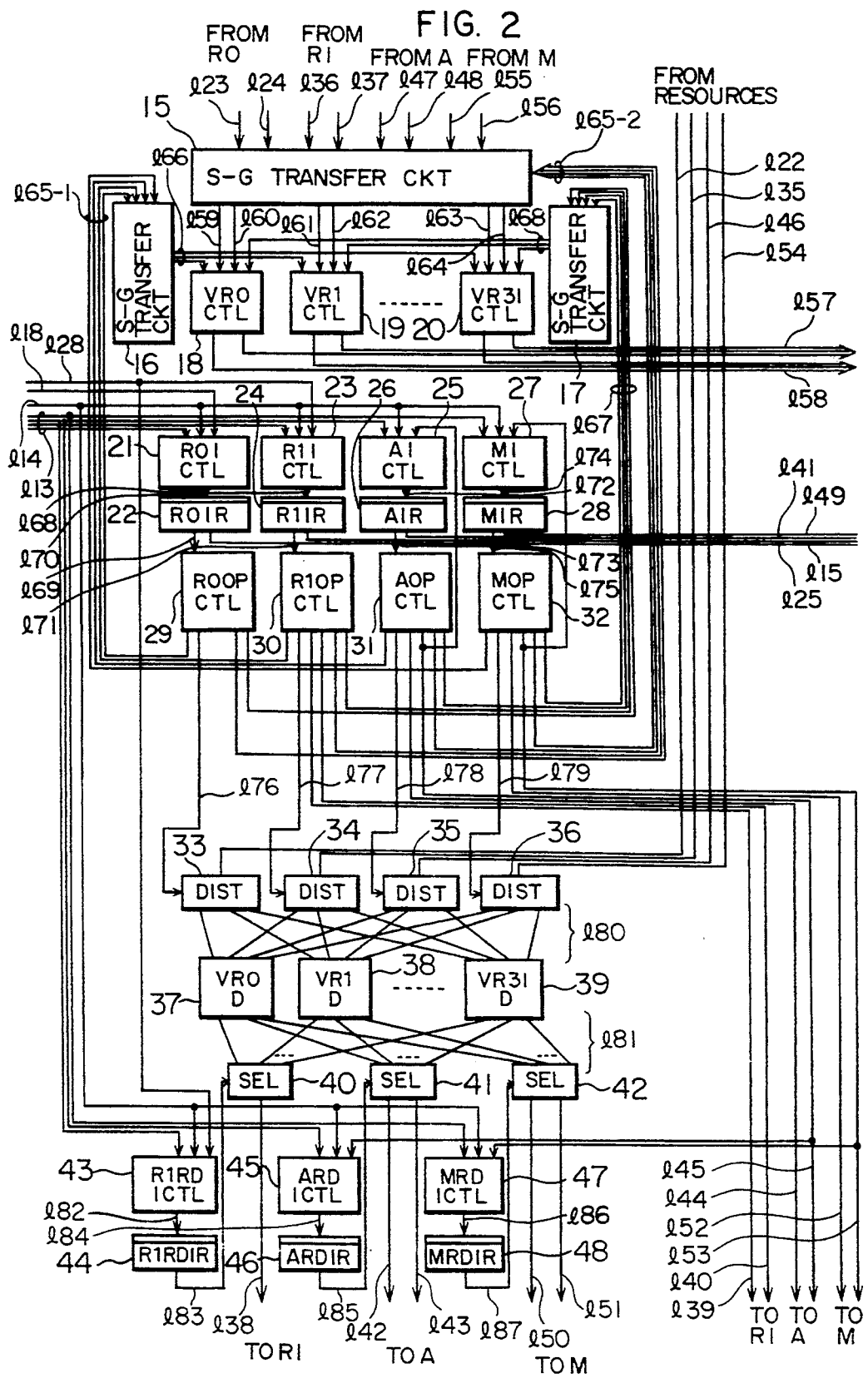
FIG. 2 is a configuration diagram schematically showing a vector register unit of the data processor of FIG. 1.

Referring now to FIG. 2, the operation of the vector register unit 14 will be described.

FIG. 2 is a schematic diagram showing an internal construction of the vector register unit 14.

In this configuration, reference numerals 37, 38, and 39 respectively designate vector registers storing vector data. Although there are actually disposed 32 vector registers, only three vector registers thereof are shown for simplification. Reference numerals 33, 34, 35, and 36 respectively denote distributors disposed in association with the respective resources for distributing the write data respectively sent via signal lines 122, 135, 146, and 154 from a memory requester 10, a memory requester 11, an adder 12, and a multiplier 13 to the write paths 180 connected to the respective vector registers. In addition, reference numerals 40, 41, and 42 are selectors disposed in association with the respective resources for selecting the read data on the read paths 181 for the respective vector registers so as to send the data to the data signal lines 138, 142, 143, 150, and 151 respectively led to the memory requester 11, the adder 12, and the multiplier 13.

Corresponding to the respective vector registers 37, 38, and 39, there are disposed vector register control circuits 18, 19, and 20 to control the read and write operations thereon.

In addition, reference numerals 29, 30, 31, and 32 respectively indicate operand control circuits disposed for the respective resources to effect, for example, transmission of the read data validity signal and the last signal to the memory requester 10, the memory requester 11, the adder 12, and the multiplier 13.

In this configuration, reference numerals 22, 24, 26, and 28 respectively denote instruction registers to hold instructions respectively being executed in the memory requester 10, the memory requester 11, the adder 12, and the multiplier 13 and are loaded with values by instruction execution start control units 21 (R0ICTL), 23 (R1ICTL), 25 (AICTL), and 27 (MICTL) disposed corresponding to the resources including the memory requester 10, the memory requester 11, the adder 12, and the multiplier 13 each having reserve means for reserving an instruction of which an execution can be started. The instruction registers 22, 24, 26 and 28 respectively hold information items indicated by an instruction such as an operation code, a vector length, and a register number to be used. In addition, there are disposed instruction registers 44 (KIKDIR), 46 (ARDIR), and 48 (MRDIR) for respectively holding the read register numbers indicated in the instructions respectively being executed in the memory requester 10, the memory requester 11, the adder 12, and the multiplier 13 and are respectively loaded with values by instruction execution start units 43 (R1RDICTL), 45 (ARDICTL), and 47 (MRDICTL) disposed corresponding to the resources including the memory requester 10, the memory requester 11, the adder 12, and the multiplier 13 each having reserve means for reserving an instruction of which an execution can be started.

The information items of the instruction registers 22, 24, 26, and 28 are respectively sent to the corresponding resources and operand control units so as to be employed for the instruction execution control, the operand control, and the switching control of the write data path in the specific resource. The information items of the instruction registers 44, 46, and 48 are respectively delivered to the corresponding selectors so as to be used for the switching control of the read data paths.

Next, details of the operation will be described.

The vector register unit 14 receives information including an operation code of the instruction to be executed, a vector length, a vector register number to be used via the signal line 114 from the instruction issue unit 9 and receives a reservation signal of the pertinent instruction via the signal line 113. The signal line 113 comprises four bits corresponding to the resource numbers 0 to 3, and 1 is delivered on a bit corresponding to the resource for which the instruction is to be executed. Each of the instruction execution start control units 21, 23, 25, and 27 fetches the content of the signal line 114 only when one of the bits of the signal line 113 corresponding to the resource number associated with the pertinent instruction execution start control unit is 1. In addition, each of the instruction execution start control units 43, 45, and 47 fetch therein only the read register number information among the contents of the signal line 114 only when one of the bits of the signal line 113 corresponding to the resource number associated with the pertinent instruction execution start control unit is 1.

The instruction execution start control units 21, 23, 25, 27, 43, 45, and 47 independently achieve operations such that if there does not exist any instruction being executed in a resource corresponding thereto, the attained contents of the signal line 114 are immediately fed respectively via the signal lines 168, 170, 172, 174, 182, 184, and 186 to the associated instruction registers 22, 24, 26, 28, 44, 46, and 48. If there exists an instruction being executed, after an execution completion report 118, 128, 145, 153, 128, 145, and 153 is received, the operation above is achieved. In this situation, the pairs of registers 24 and 44, 26 and 46, and 28 and 48 respectively corresponding to the same resource are loaded with values respectively at the same timing, which will be described later in detail.

Of the contents of the instruction registers 22, 24, 26, and 28, the operation codes and the vector lengths are respectively delivered to the memory requester 10 and the memory requester 11, and the operation codes are delivered to the adder 12 and the multiplier 13. These items are fed through the signal lines 115, 125, 141, and 149, respectively. This operation is successively accomplished until the execution of the instruction is completed.

In addition, the contents of the instruction registers 22, 24, 26, and 28 are immediately supplied via the signal lines 169, 171, 173, and 175 to the corresponding operand control circuits 29, 30, 31, and 32, respectively. Each operand control circuit which has received the signal independently issues a read or write start instruction to the vector register control circuit 18, 19, or 20 corresponding to the register number specified by the signal for use in the operation. The read or write start instruction is sent from the respective operand control circuits 29, 30, 31, and 32 to the signal line 165-1 for the respective resources and is then converted by an S-G transfer circuit 16 into a read/write start instruction associated with each register so as to be supplied via the signal line 166 to the respective vector register control circuits 18, 19, and 20.

When a read register number is set to the instruction registers 44, 46, and 48, the selectors 40, 41, and 42 for selecting the read paths attain the read register number information respectively via the signal lines 183, 184, and 185 so as to immediately change over the connection of the read paths. On the other hand, the write path distributors 33, 34, 35, and 36 are respectively switched in response to instructions from the signal lines 176, 177, 178, and 179; however, the switch instruction is here transmitted with an interval after a value is set to the corresponding instruction register. The interval is assigned with a value unique to each resource and is equal to a period of time (called a travel time) elapsed from when the data is read out to when the resultant data is written back after an operation effected thereon. In addition, the operand control circuits 29, 30, 31, and 32 supply the S-G transfer circuit 15 via the signal line 165-2 at an interval equivalent to the travel time with information items indicating registers to which write operations are effected by the respective resources.

In a case where the instruction set to the specific instruction register is an instruction to achieve a read operation on a vector register, namely, a main memory write instruction or an arithmetic instruction, the operand control circuits 30, 31, and 32 respectively corresponding to the resources executing the instructions such as the memory requester 11, the adder 12, and the multiplier 13 sequentially generate the validity signals 139, 144, and 152 of the read data in association with the vector lengths respectively loaded in the instruction registers 24, 26, and 28, thereby transmitting the validity signals to the corresponding resources. On the other hand, the vector register control circuit which has received the read start instruction sequentially read data from the associated vector register so as to send the data to the read paths 80. Since details about the generation control of the validity signal and the data read control have been described in the U.S. Pat. No. 4,617,625, description thereof will not be given in this text. The data supplied to the read paths 180 are passed to the selectors 40, 41, and 42 so as to be sequentially transmitted via the signal lines 138, 142, 143, 150, and 151 from the respective resources. In this situation, since the switch operation of the read paths 180 is effected immediately after the values are respectively set to the instruction registers 44, 46, and 48, the data thus read out are appropriately transmitted to the pertinent resources.

In a case where a main memory read instruction is being executed in the memory requesters 10 and 11 or where an arithmetic instruction is being executed in the adder 12 and the multiplier 13, the respective resources sequentially send thereto write data via the signal lines 122, 135, 146, and 154 and the validity signals of the data via the signal lines 123, 136, 147, and 155. The validity signals 123, 136, 147, and 155 are transmitted in association with the resources and are then converted by the S-G transfer circuit 15 into the data validity signals 159, 161, and 163 for the corresponding vector registers so as to be supplied to the respective vector register control circuits 18, 19, and 20. Information items necessary for the conversion of the resource numbers and the register numbers are supplied via the signal line 165-2 to the S-G transfer circuit 15 at an interval equivalent to the travel time after the values are set to the instruction registers 22, 24, 26, and 28, which appropriately conforms to the timing when the first write data validity signals arrive via the signal lines 123, 136, 147, and 155 from the respective resources.

On the other hand, the write data 122, 135, 146, and 154 sent from the associated resources are distributed by the corresponding distributors 33, 34, 35, and 36 to the write paths corresponding to the pertinent vector registers. The write path switch instruction signals 176, 177, 178, and 179 are transmitted at an interval equivalent to the travel time after the values are set to the instruction registers 22, 24, 26, and 28, which appropriately conforms to the timing when the first write data items arrive via the signal lines 122, 135, 146, and 154 from the respective resources.

The vector register control circuits 18, 19, and 20 which have beforehand received a write start instruction sequentially receives the respective write data validity signals 159, 161, and 163 so as to sequentially write, only when the pertinent validity signal has a value of 1, the value attained from the signal line 180 in the associated vector registers 37, 38, and 39, respectively.

The operand control circuits 30, 31, and 32 corresponding to the memory requester 11, the adder 12, and the multiplier 13 deliver, when transmitting the validity signals 139, 144, and 152 of the last vector data items to be processed by the instructions respectively indicated by the corresponding instruction registers 24, 26, and 28, the data last signals 140, 145, and 153 to the associated resources at the same time. Of the data last signals, the last signals 145 and 153 corresponding to the adder 12 and the multiplier 13 are also employed as the instruction execution completion reports for the adder 12 and the multiplier 13 and hence are respectively supplied to the sets of the instruction execution start control units 25 and 45 as well as 27 and 47. The instruction execution completion reports for the memory requester 10 and memory requester 11 are respectively attained via the signal lines 118 and 128 from the corresponding resources so as to be respectively supplied to the instruction start control units 21, 23, and 43.

In addition, the operand control circuits 29, 30, 31, and 32 each send, when transmitting the data last signals, the read completion reports to the associated vector register control circuits at the same time. The read completion reports are transmitted via the signal line 167 to the respective resources and are converted by the S-G transfer circuit 17 into the read completion reports for the specific registers so as to be delivered to the respective vector register control circuits 18, 19, and 20. On receiving the read completion reports, the vector register control circuits 18, 19, and 20 terminate the read control on the respective vector registers and then send read completion reports corresponding to the respective registers via the signal line 157 to the register use state hold register 4.

On the other hand, in a case where the write data corresponding to the validity signals 123, 136, 147, and 155 associated with the write data sent from the respective resources are the last write data to be processed by the corresponding instructions, the data last signals are transmitted, together with the data validity signals, via the signal lines 124, 137, 148, and 156 from the respective resources. The data last signals 124, 137, 148, and 156 are converted by the S-G transfer circuit 15 into data last signals 160, 162, and 164 for the respective vector registers so as to be supplied thereto. On receiving the data last signals 160, 162, and 164 as write termination reports, the vector register control circuits 18, 19, and 20 terminate the write control on the corresponding vector registers and then transmit the write completion reports for the respective registers via the signal line 158 to the register use state hold register 4.

The instruction execution start control units 21, 23, 25, 27, 43, 45, and 47 immediately change over, on receiving the respective instruction execution completion reports 118, 128, 145, and 153, the values of the corresponding instruction registers 22, 24, 26, 28, 44, 46, and 48 to the instructions to be next executed, which will be described later in details.

In consequence, the memory requester 10 and memory requester 11 are respectively loaded with the operation codes and the vector lengths of the instructions to be next executed for the clock succeeding the clock for which the instruction execution completion reports 118 and 128 are transmitted. Moreover, the operand control circuits associated with the memory requester 10 and memory requester 11 issue a read/write start instruction to the respective vector register control circuits for the clock succeeding the clock for which the instruction execution completion reports 118 and 128 are transmitted and further can transmit at the same time the validity signal 139 of the first read data to be processed by the instructions. On the other hand, since the selector 40 changes over the connection of the read paths 181 for the clock succeeding the clock for which the instruction execution completion report 128 is transmitted, the data read out by the vector register control circuits 18, 19, and 20 which have received the read start instruction are transmitted to the appropriate resources.

The adder 12 and the multiplier 13 are also supplied with the operation codes of the instruction to be next processed for the clock succeeding the clock for which the data read last signals 145 and 153 are transmitted as instruction execution completion reports thereto such that the read/write start instructions are delivered to the vector register control circuits 18, 19, and 20 at the same timing and the validity signals 144 and 152 of the first data to be processed by the pertinent instructions are transmitted. In consequence, the data validity signals 144 and 152 are transmitted for the different instructions without causing any interval to appear therebetween. On the other hand, at the same timing, the selectors 41 and 42 change over the connection of the read paths 181, and hence the read data are sent to the appropriate resources.

In addition, the change-over operation of the write paths 180 by the distributors 33, 34, 35, and 36 are effected, after the execution completion reports 118, 128, 145, and 153 of an instruction are transmitted, at an interval equivalent to the travel time of the resource executing the instruction. Consequently, the write paths 180 are connected to the write register of the instruction until the last write data to be processed by the instruction is sent to the write paths 180 connected to the vector registers 37, 38, and 39 for which the write operation is specified by the instruction, thereby writing the data to the pertinent register. For the next clock, the connection of the write paths 180 are changed over such that even when the first write data to be processed by the instruction succeeding the preceding instruction is immediately sent from the resource without any interval therebetween, the write data can be written in the appropriate register.

As described above, in the vector register unit 14, there are disposed the instruction execution start control units each having therein reserve means disposed for each resource to reserve an instruction of which an execution can be started, the operation codes, the vector lengths, and the read vector data respectively of the instruction to be executed for the corresponding resources can be successively transmitted without any interval therebetween.

Furthermore, according to the embodiment, although the instruction execution start control units are disposed only in the vector register unit 14 such that the information items of the operation code and the vector length are sent from the pertinent instruction execution start control unit, the same effect can be attained by disposing, in the unit controlling each resource instruction, reserve means to hold the information of the operation code and the vector length and a control unit to control the reserve means so that the information items are directly delivered to each resource from the instruction issue unit 9, thereby instructing the reservation of the instruction execution.

In addition, according to the embodiment, although the change-over instruction to switch the write paths 181 are achieved from the operand control circuits, there may be disposed instruction hold means to hold write register number information and a control unit to control the reserve means such that the distributors 33, 34, 35, and 36 are switched in response to the instructions of the output signals supplied from the control unit.

Moreover, according to the embodiment, although there are disposed the instruction execution start control units 43, 45, and 47 each controlling instruction reserve means to hold only read register number information such that the read paths 181 are switched in response to the instructions of the output signals supplied from the instruction execution start control units 43, 45, and 47; the instruction of the change-over of the read paths 181 may be directly issued from the operand control circuits 30, 31, and 32 without disposing the instruction execution start control units 43, 45, and 47.

EXECUTION START CONTROL UNIT

Next, the operation of the execution start control unit will be described with reference to FIG. 3 in which the execution start control unit 25 corresponding to the address 12 of FIG. 1 is employed as an example thereof.

FIG. 3 is a configuration diagram showing an internal construction of the execution start control unit 25. In this embodiment, for the execution start reserved instructions, it is assumed that a maximum of two instructions currently being executed can be held in the unit 25 such that the instructions thus held are initiated for execution in an order in which the reservation of the execution start is accepted.

The signal line 114 is supplied with information items necessary for the instruction execution such as an operand code, a vector length, a vector register number to be used from the instruction issue unit 9. The signal line 113 delivers a reservation signal for an instruction execution start sent from the instruction execution unit 9 and specifies whether or not the instruction execution information items above are to be received as information items of an execution start reserved instruction. The signal line 145 transmits a signal sent from the adder 12 to notify the completion of an execution of an instruction. The instruction register (AIR) 26 is a register to hold an instruction being currently executed in the adder 12, and the contents of the register 26 are fed via the signal lines 173 and 115 to the operand control circuit 31 and the adder 12, respectively.

The configuration of FIG. 3 includes an instruction register 49 to hold an execution start reserved instruction waiting for an execution and a selector 50, which selects either one of the content of the signal line 114 or the content of the execution wait instruction register (ANIR) 49 attained through the signal line 188 so as to send the selected data to the signal line 172. According to this embodiment, since the execution of an instruction need only be started in an order in which the reservation for the execution start is accepted, the execution start control unit 25 is required only to effect the operations as follows. That is, in a case where an instruction of an execution start reservation of an instruction is received from the signal line 113 when there does not exist any instruction currently being executed, the execution start reserve instruction of the instruction is immediately delivered from the signal line 114 to the signal line 172 so as to be set to the instruction register 26; whereas, in a case where an instruction of an execution start reservation of an instruction is received from the signal line 113 when there exists an instruction currently being executed, the execution start reserve instruction of the instruction from the signal line 114 is set to the execution wait instruction register 49 such that after the notification of the execution completion of the instruction currently being executed is received, the content of the execution wait instruction register 49 is set to the instruction register 26.

Next, the control method above will be described in detail.

In FIG. 3, reference numeral 51 designates a register comprising two bits to indicate the number of the execution start reserved instructions held in the system. Reference numeral 52 denotes an instruction execution start control mechanism (IRQUECTL), which receives the reserve instruction signal 113 of an execution start reserved instruction and the completion report signal 145 of an instruction being executed so as to update the content of the register (IREQUEST) indicating the reserved instruction hold state and then sends a set signal 189 to the execution wait register 49, a change-over signal 190 to the selector 50, and a set signal 191-A to the instruction register 26.

FIG. 4 is a state transition diagram of the reserved instruction hold state indicate register 51. In this diagram, reference numerals 51-1, 51-2, 51-3, and 51-4 respectively indicate values represented by the bits constituting the reserved instruction hold state indicate register 51. In the state 51-1, there does not exist any instruction reserved for the instruction start. The state 51-2 designates that only one instruction has been reserved for the execution start and that the pertinent instruction is held in the instruction register 26. In the state 51-3, two instructions have been reserved for the execution start and that these instructions are held in the instruction registers 26 and 49, respectively. The state 51-4 designates a state taking place when a combination of a signal which cannot be possibly appear if the machine or system is appropriately effecting the operation is received, and in this state, a machine check signal (not shown) is transmitted. In FIG. 4, symbols I and $\bar{I}$ and E and $\bar{E}$ respectively indicate values to be represented by the reserve instruction signal 113 and the completion report signal 145 indicating a completion of an execution of an instruction currently being executed, namely, I denotes that a value of 1 is loaded in the reserve indication signal 113, $\bar{I}$ designates that the value thereof is 0, E indicates that a value of 1 is loaded in the completion report signal 145, and $\bar{E}$ denotes that the value thereof is 0. In this configuration, the value of 1 stored in the reserve instruction signal 113 means that a reservation of an instruction execution start has been instructed, whereas the value of 0 indicates that the reservation has not been instructed. In addition, the value of 1 stored in the current instruction completion report signal 145 means that a completion report of the instruction being executed has been received, whereas the value of 0 indicates the completion report has not been yet received.

On receiving the reserve instruction signal 113 and the current instruction completion report signal 145, the execution start control mechanism 52 of FIG. 3 updates, depending on the value of the reserved instruction hold state indication register 51, the value of the state indication register 51 via the signal line 192 according to the state transition diagram of FIG. 4.

When the value of the reserved instruction hold state indication register 51 is 00 and there does not exist any instruction reserved for the execution start, if neither the reserve instruction signal 113 nor the current instruction completion report signal 145 are received (that is, $\bar{I}$ and $\bar{E}$ are produced), the value of the state indication register 51 need not be updated; consequently, as indicated by the arc a1, the value of the state indication register 51 remains to be 00. When the value of the state indication register 51 is 00, if the reserve indication signal 113 is received and the current instruction completion report signal 145 is not received (namely, I and $\bar{E}$ are produced), the execution start reserved instruction is to be held only in the instruction register 26, and hence, as indicated by the arc a2, the value of the state indication register 51 is updated to be 01. When the value of the state indication register 51 is 00, if the current instruction completion report signal 145 is received (namely, E is produced), the machine check signal is transmitted and the value of the state indication register 51 is updated to be 11.

When the value of the reserved instruction hold state indication register 51 is 01 and only an instruction is held in the instruction register so as to be reserved for the execution start, if neither the reserve indication signal 113 nor the current instruction completion signal 145 is received (that is, $\bar{I}$ and $\bar{E}$ are produced), the value of the state indication register 51 is not required to be updated and hence, as indicated by the arc a4, the value of the state indication register 51 is remained to be 01. When the value of the reserved instruction hold state indication register 51 is 01, if both of the reserve indication signal 113 and the current instruction completion signal 145 are received (namely, I and E are produced), the content of the instruction register 26 is immediately replaced with the content of the signal line 114 and the execution wait register 49 does not hold any data; consequently, as indicated by the arc a4, the value of the state indication register 51 is remains to be 01. When the value of the reserved instruction hold state indication register 51 is 01, if the reserve indication signal 113 is not received and the current instruction completion signal 145 is received (namely, $\bar{I}$ and E are produced), there does not exist any instruction to be held in the system, as shown by the arc a5, the value of the state indication register 51 is updated to 00. When the value of the reserved instruction hold state indication register 51 is 01, if the reserve indication signal 113 is received and the current instruction completion signal 145 is not received (namely, I and $\bar{E}$ are produced), there exist two execution start reserved instructions to be held in the system, as indicated by the arc a6, the value of the state indication register 51 is updated to 10.

In a state where the value of the reserved instruction hold state indication register 51 is 10 and two instructions are respectively held in the instruction register 26 and the execution wait instruction register 49 so as to be reserved for the execution start, if neither the reserve indication signal 113 nor the current instruction completion report signal 145 are received (that is, $\bar{I}$ and $\bar{E}$ are produced), the value of the state indication register 51 need not be updated, and hence, as indicated by the arc a7, the value of the state indication register 51 is remained to be 10. When the value of the reserved instruction hold state indication register 51 is 01, if the reserve indication signal 113 is not received and the current instruction completion signal 145 is received (namely, $\bar{I}$ and E are produced), the content of the instruction register 26 is immediately replaced with the content of the execution wait instruction register 49 and hence the execution wait register 49 does not contain any data; consequently, as indicated by the arc a8, the value of the state indication register 51 is updated to 01. When the value of the reserved instruction hold state indication register 51 is 01, if the reserve indication signal 113 is received (namely, I is produced), the machine check signal is transmitted and the value of the state indication register 51 is updated to 11.

The execution start control mechanism 52 of FIG. 3 receives the reserve indication signal 113, the current instruction completion report signal 145, and the current value of the reserved instruction hold state indication register 51 obtained via the signal line 193 so as to transmit the set signal 191 to the instruction register 26, the set signal 189 to the execution wait register 49, and the change-over signal 190 to the selector 50. FIG. 5 is a table listing the values to be set to the set signal 191 to the instruction register 26, the set signal 189 to the execution wait register 49, and the change-over signal 190 to the selector 50 corresponding to the values of the received signals 113, 145, and 193. In FIG. 3, it is assumed that the registers 26 and 49 respectively hold the values of the signal lines 172 and 114 when the signal lines 191 and 189 each include 1 and that the selector 50 selects the value of the signal line 114 when the value of the signal line 190 is 0 and selects the value of the signal line 188 when the signal line 190 is 1 so as to transmit the selected value to the signal line 172. Subsequently, the operations described in conjunction with FIG. 3 are developed when the signals are transmitted according to FIG. 5.

In a state where the state indication register 51 contains a value of 00 and there does not exist any instruction reserved for the execution start, when the reserve indication signal 113 is received and the current instruction completion report signal 145 is not received, if the value of the change-over signal 190 for the selector 50 is set to 0 and the set signal 191 for the instruction register 26 is set to 1, the content of the signal line 114 can be loaded in the instruction register 26.

In a state where the value of the state indication register 51 is 01 and an instruction reserved for the execution start is held only in the instruction register 26, when the reserve indication signal 113 and the current instruction completion report signal 145 are received, if the value of the change-over signal 190 for the selector 50 is set to 1 and the set signals 191 and 189 respectively for the instruction register 26 and the execution wait instruction register 49 are set to 1, the content of the execution wait instruction register 49 can be set to the instruction register 26 and the content of the signal line 114 can be set to the execution wait instruction register 49.

In a state where the value of the reserved instruction hold state indication register 51 is 01, when the reserve indication signal 113 is received and the current instruction completion signal 145 is not received, if the set signal 191 for the instruction register 26 is set to 0 and the set signal 189 for the execution wait instruction register 49 is set to 1, the content of the signal line 114 can be set only to the execution wait instruction register 49.

In a state where the value of the reserved instruction hold state indication register 51 is 10 and the instructions reserved for the execution start are held in the instruction register 26 and the execution wait instruction register 49, when the reserve indication signal 113 is not received and the current instruction completion signal 145 is received, if the set signal 191 for the instruction register 26 is set to 0, the content of the execution wait instruction register 49 can be set to the instruction register 26.

In cases other than those described above, it is not required to set values to the instruction register 26 and the execution wait instruction register 49, and hence the set signal 191 to the instruction register 26, the set signal 189 to the execution wait register 49, and the change-over signal 190 to the selector 50 need only by set to 0.

By setting the values as described above, the execution start control mechanism 52 can effect control operations such that, on receiving the execution start reserve instruction of an instruction from the signal line 113 when there does not exist any instruction currently being executed, an execution start reserve instruction is immediately transmitted to the signal line 172 so as to be set to the instruction register 26; whereas, the execution start reserve instruction on the signal line 114 is set to the execution wait instruction register 49 if the execution start reserve instruction of an instruction is received from the signal line 113 when there exists an instruction currently being executed, and then after the report of the execution completion of the instruction currently being executed is received, the content of the execution wait instruction register 49 is set to the instruction register 26.

Incidentally, in this embodiment, although up to two execution start reserved instructions can be held in the system including the instruction currently being executed, it is natural that the system is not substantially changed even when up to three such instructions are held in the system. In addition, the sequence of the start of the instruction execution effected by the execution start control unit 25 is not limited to the sequence in which the reservation of the execution start is received.

RESOURCE AVAILABILITY JUDGEMENT

In the configuration of FIG. 1, the instruction issue control is accomplished by the instruction issue unit 9 according to the judgement results obtained from the register availability judge unit 7 and the resource availability judge unit 8. The resource availability judgement is effected by comparing a resource use request of a decoded instruction with the use reservation state of each resource. The judgement method and the instruction issue control will be next described. Incidentally, since the method of judging the register availability has been described in detail in the U.S. Pat. No. 4,617,625, description thereof will be avoided in this text.

Figure 6:
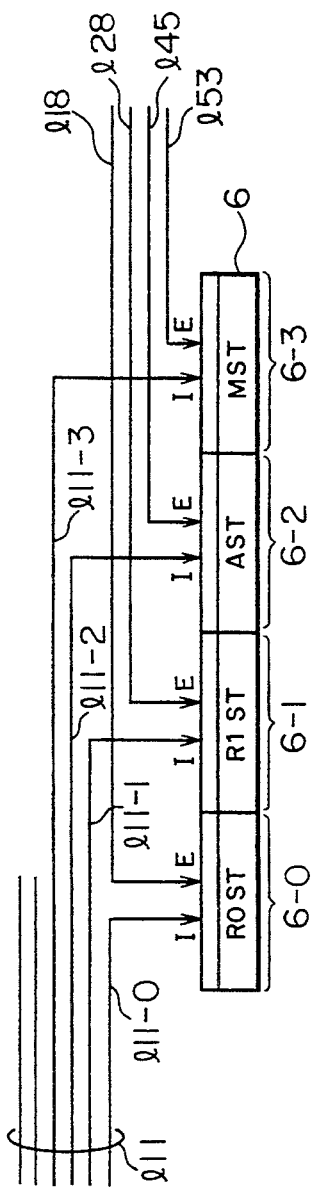
FIG. 6 is a configuration diagram of a resource reservation state hold register.

FIG. 6 is a schematic diagram showing a configuration of the resource reservation state hold register 6 and signal lines employed to update the content of the register 6. The resource reservation state hold register 6 comprises a memory requester 10 reservation state hold unit (R0ST) 6-0, a memory requester 11 reservation state hold unit (R1ST), an adder reservation state hold unit (AST) 6-2, and a multiplier reservation state hold unit (MST). A signal line 111 delivers an update signal supplied from the instruction issue unit 9 to update the register use state hold register 4 and the resource reservation state hold register 6, namely, four bits 111-0, 111-1, 111-2, and 111-3 of the signal line 111 are used to update the resource reservation state hold register 6. The bit 111-0 is a signal to indicate that a reserve indication or instruction of an executable instruction is effected to the memory requester 10, and the bit 111-1, 111-2, and 111-3 are used to indicate the same condition to the memory requester 11, the adder 12, and the multiplier 13, respectively.

Signal lines 118, 128, 145, and 153 represent instruction execution completion reports sent from the memory requester 10, the memory requester 11, the adder 12, and the multiplier 13, respectively. The reservation state hold units 6-0, 6-1, 6-2, and 6-3 of the respective resources each include two bits, which indicate the same execution start reserved instruction hold states of the respective resources as those represented by the values contained in the reserved instruction state indication register 51 listed in FIG. 3. In addition, the update control mechanism (not shown) of the reservation state hold units 6-0, 6-1, 6-2, and 6-3 effects update operations according to the state transition diagram of FIG. 4. However, in the update of the state hold unit 6-0, I of FIG. 4 indicates that the value of the signal line 111-0 is 1, $\bar{I}$ designates that the value of the signal line 111-0 is 0, E denotes that the value of the signal line 118 is 1, and $\bar{E}$ indicates that the value of the signal line 118 is 0. Furthermore, in the update of the state hold unit 6-1, I of FIG. 4 denotes that the value of the signal line 111-1 is 1, I designates that the value of the signal line 111-1 is 0, E denotes that the value of the signal line 128 is 1, and $\overline{E}$ indictes that the value of the signal line 128 is 0. In addition, in the update of the state hold unit 6-2, I of FIG. 4 denotes that the value of the signal line 111-2 is 1, $\overline{I}$ designates that the value of the signal line 111-2 is 0, E denotes that the value of the signal line 145 is 1, and $\overline{E}$ indicates that the value of the signal line 145 is 0. Moreover, in the update of the state hold unit 6-3, I of FIG. 4 denotes that the value of the signal line 111-3 is 1, $\overline{I}$ designates that the value of the signal line 111-3 is 0, E denotes that the value of the signal line 153 is 1, and $\overline{E}$ indicates that the value of the signal line 153 is 0.

By updating the values of the respective state hold units 6-0, 6-1, 6-2, and 6-3 as described above, the same information items are stored in these state hold units 6-0, 6-1, 6-2, and 6-3 and the reserved instruction hold state indication registers corresponding to the respective resources.

The resource availability judge unit 8 achieves the availability judgement of the specific resources for each clock by use of the information items loaded in the respective state hold units 6-0, 6-1, 6-2, and 6-3; in addition, the instruction issue unit 9 immediately sends a reservation instruction of an instruction execution start, when the register and the resource become to be available, to the resource in which the instruction is to be executed.

Next, the operations thereof will be described.

The resource availability judge unit 8 of FIG. 3 attains respectively via the signal lines 18 and 17 the information items of the resource reservation state hold register 6 of which the values are updated as described above and the resource use request hold register 5 so as to judge whether or not an instruction execution start can be further reserved for a resource to be used by the decoded instruction, thereby sending the result of the judgement to the signal line 110. The control method of this operation will be next described.

Figure 7:
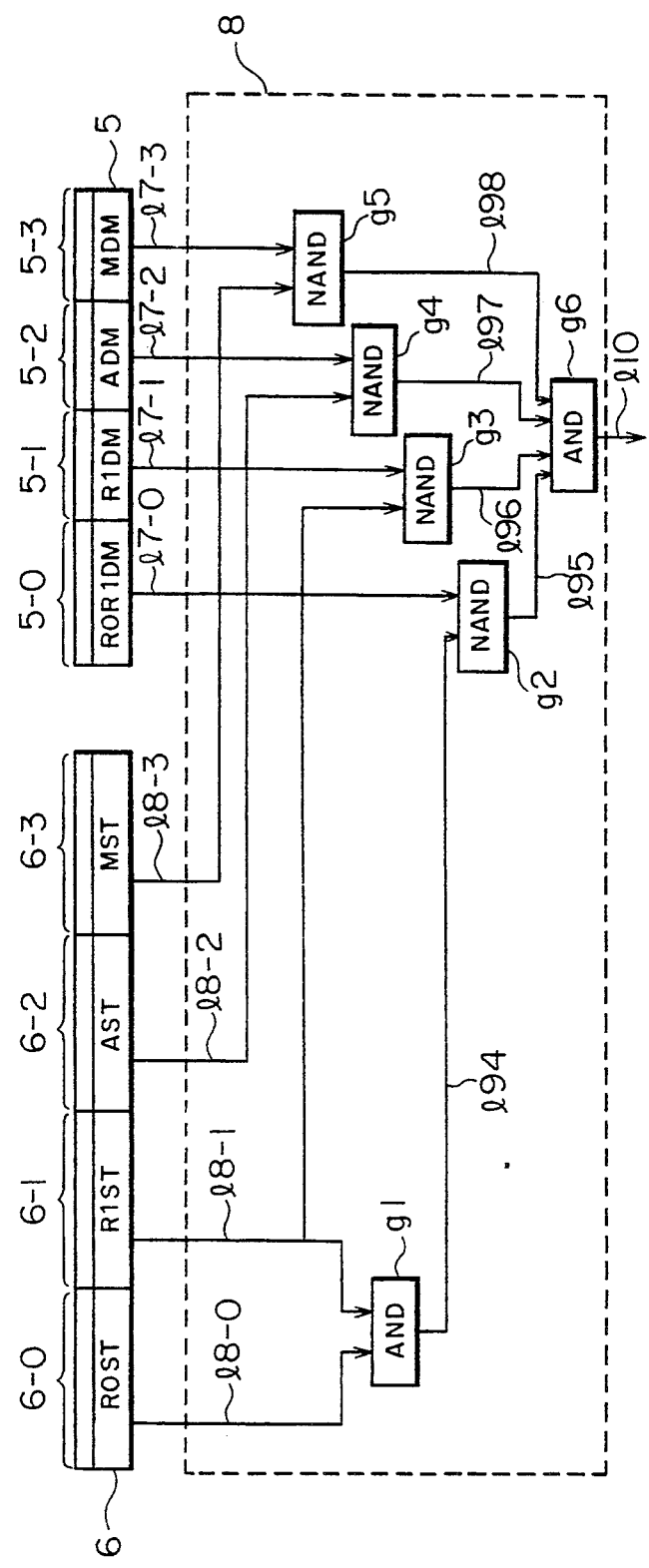
FIG. 7 is a configuration diagram of a resource availability judge unit.

FIG. 7 is a schematic circuit diagram of a circuit capable of effecting the judgement above. The configuration of FIG. 7 includes a resource reservation state hold register 6 and a resource use request hold register 5. The configuration of the state hold register 6 is the same as that already described above. The request hold register 5 comprises a memory requester 0/1 use request hold unit (ROR1DM) 5-0, a memory requester 11 use request hold unit (RIDM) 5-1, an adder use request hold unit (ADM) 5-2, and a multiplier use request hold unit (MDM) 5-3, each unit including a bit. In this embodiment, the resources capable of executing a main memory read instruction are the memory requesters 10 and 11, a resource capable of executing a main memory write instruction is only the memory requester 11, a resource capable of executing instructions associated with an addition is only the adder 12, and a resource capable of executing instructions associated with a multiplication is only the multiplier 13. In consequence, the instruction decode unit 13 sets a value of 1 to the memory requester 0/1 use request hold unit 5-0 if the decoded instruction is a main memory read instruction, sets a value of 1 to the memory requester (1) use request hold unit 5-1 if the decoded instruction is a main memory write instruction, sets a value of 1 to the adder use request hold unit 5-2 if the decoded instruction is associated with an addition, and sets a value of 1 to the multiplier use request hold unit 5-3 if the decoded instruction is related to a multiplication. The signal line 110 is disposed to transmit the result of the resource availability judgement.

For an execution of a main memory write instruction, an instruction associated with an addition, or an instruction related to a multiplication, in order to accomplish the availability judgement of the memory requester 11, the adder 12, or the multiplier 13, the values of the bit 0 of each of the resource reservation hold units 6-1, 6-2, and 6-3 and the values of the respective resource use request hold units 5-1, 5-2, and 5-3 need only be respectively fed via the signal lines 17-1, 17-2, and 17-3 to the NAND gates g3, g4, and g5. This is because when the value of the bit 0 of each of the resource reservation hold units 6-1, 6-2, and 6-3 is 0, each resource holds at most one execution start reserved instruction, and hence an executable instruction can be further reserved. When the value of bit 0 is 1 in each of the reservation hold units 6-1, 6-2, and 6-3, each resource holds two execution start reserved instructions, and hence another executable instruction cannot be reserved. On the other hand, the request hold units 5-1, 5-2, and 5-3 each are set to 1 only when there exist requests related thereto. In consequence, by effecting an NAND operation between the values of bit 0 of the reservation hold units 6-1, 6-2, and 6-3 and the values of the request hold units 5-1, 5-2, and 5-3, respectively, each of the signal lines 196, 197, and 198 are supplied with a value of 0 only when there exists a use request for the corresponding resource and the executable instruction cannot be reserved for the resource, whereas a value of 1 is delivered thereto when the executable instruction can be reserved or when there does not exist any reserve request.

In order to effect the availability judgement for an execution of a main memory read instruction, it is only necessary to input the values of the bit 0 of the memory requester (0) reservation hold unit 6-1 and the memory requester (1) reservation hold unit 6-2 via the signal lines 18-0 and 18-1 to the AND gate g1 so as to deliver the result of the AND operation to the signal line 194 such that the value on the signal line 194 and the value of the memory requester 0/1 use request hold unit 5-0 attained via the signal line 17-0 are NANDed in the NAND gate g2. This is because, the ANDed result of the values of the bit 0 of the memory requester (0) reservation hold unit 6-1 and the memory requester (1) reservation hold unit 6-2 is 1 only when the memory requesters (0)10 and (1)11 each have two execution start reserved instructions and the reservation of the executable instruction is impossible. In consequence, when effecting an NAND operation between the values of the signal line 194 and the request hold unit 5-0, a value of 0 is produced only if there exists a use requester for the memory requester 0/1 and the reservation of the executable instruction cannot be effected for the pertinent resource; whereas, a value of 1 is delivered if the executable instruction can be reserved or if there does not exist any reservation request. Consequently, by obtaining ANDed result of the signal lines 195, 196, 197, and 198 by means of the AND gate g6, a value of 0 is supplied to the signal line 110 if the executable instruction cannot be reserved for the resource; otherwise, a value of 1 is delivered thereto.

INSTRUCTION ISSUE CONTROL

Figure 8:
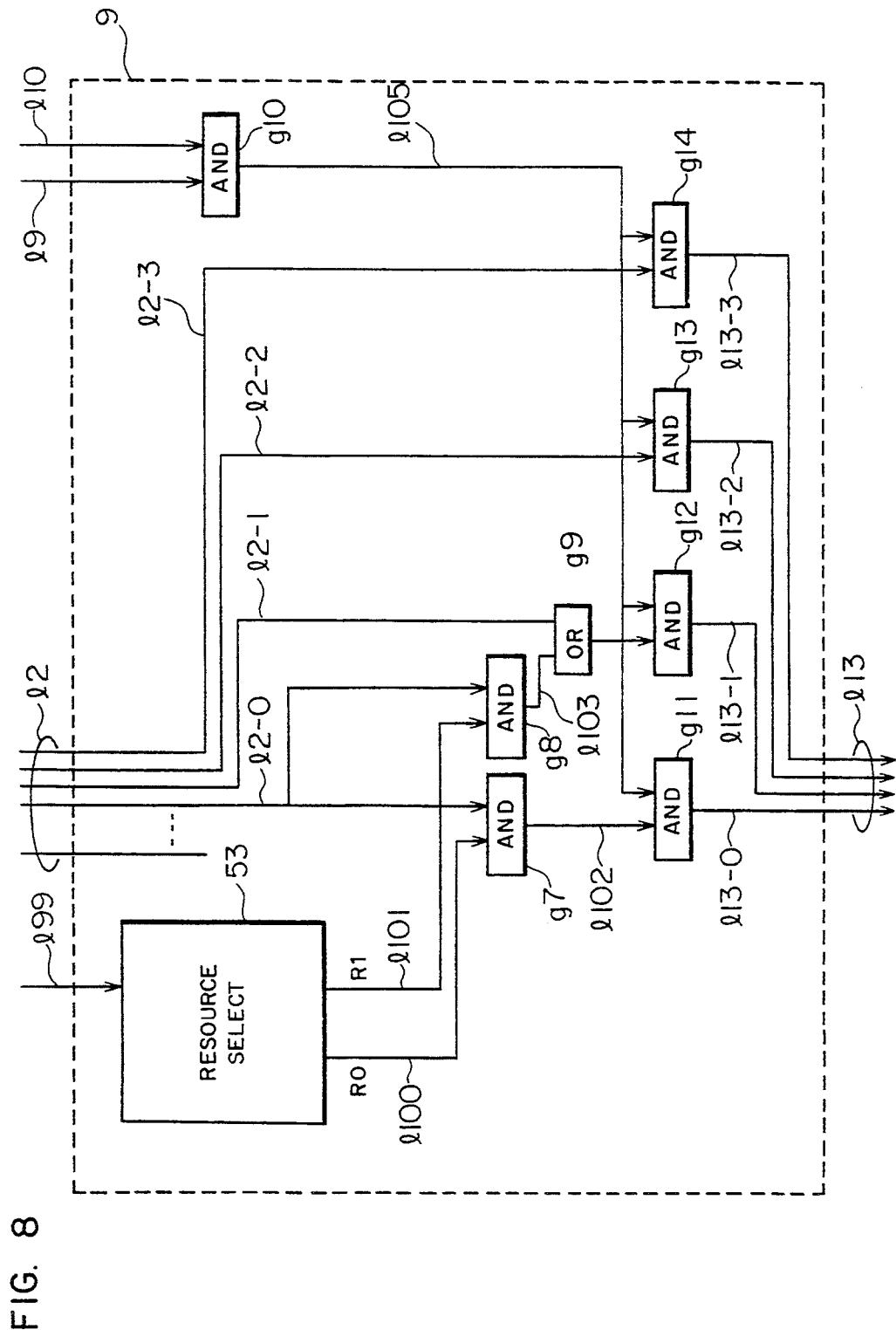
FIG. 8 is a configuration diagram of an instruction issue unit.

The instruction issue unit 9 of FIG. 8 obtains the register availability judge result, the resource availability judge result thus attained, and the decoded instruction respectively via the signal lines 19, 110, and 12 so as to select a resource, by use of the resource select mechanism 53, for which the instruction execution start is to be reserved when the register availability judge result and the resource availability judge result are both positive, thereby transmitting the reserve signal of the instruction execution start via the signal line 113 to the instruction execution start control unit corresponding to the pertinent resource. In this embodiment, the resource selection is required to be achieved in a case where the decoded instruction is a main memory read instruction. In other cases, there exists only one resource for which the instruction can be executed, and hence the resource selection is not required to be effected. The control method of the resource select operation above will be described as follows.

FIG. 8 is a circuit diagram of a circuit capable of accomplishing the control in which a signal line 199 is supplied with the content of the resource reservation state hold register 6. A signal line 12 delivers the instruction decode result of which a memory requester 10/11 use request signal 12-0, a memory requester 11 use request signal 12-1, an adder use request signal 12-2, and a multiplier use request signal 12-3 are used for the transmission of the reserve signal. The value of the memory requester 0/1 use request signal 12-0 is set to 1 if the result of the decoding effected on an instruction is a memory read instruction. The value of the memory requester 11 use request signal 12-1 is set to 1 if the result of the decoding effected on an instruction is a memory write instruction. The value of the adder use request signal 12-2 is set to 1 if the result of the decoding effected on an instruction is an instruction related to an addition. The value of the multiplier use request signal 12-3 is set to 1 if the result of the decoding effected on an instruction is an instruction related to a multiplication. The signal line 19 indicates the register availability judge result and the signal line 110 denotes the resource availability judge result. Since the signal line 1105 is loaded with the ANDed result obtained between the values of the signal lines 19 and 110 by use of the AND gate g10, the value of the signal line 1105 is set to 1 only when both of the judge results above are positive. The signal lines 113-0, 113-1, 113-2, and 113-3 respectively deliver the reserve signals of the instruction execution starts corresponding to the instruction execution control units associated with the memory requester 10, the memory requester 11, the adder 12, and the multiplier 13, respectively. The signal lines 113-0 to 113-3 representing four bits are supplied via the signal line 113 to the vector register unit 14.

The resource select mechanism 53 effects in any case, regardless of the content of the instruction decode result 12, a selection so as to send a reserve indication or instruction to the memory requester 10 or 11 according to the content of the resource reservation state hold register 6 and other information items obtained via the signal line 199, which will be described later in detail. When the memory requester 10 is selected as the resource to which the reservation instruction is to be transmitted, the resource select mechanism 53 sets a value of 1 to the memory requester (0) select signal 1100 and the memory requester (1) select signal 1101. Details about the operation of the resource select mechanism will be described later in detail.

The values thus set to the signal lines 1100 and 1101 are respectively ANDed with the value of the memory requester 0/1 use request signal 12-0 by means of the AND gates g7 and g8, respectively so as to send the results to the signal lines 1102 and 1103, respectively. The signal line 1102 is set to 1 only when the decoded instruction is a main memory read instruction and the memory requester 10 is selected, whereas the signal line 1103 is set to 1 only when the decoded instruction is a main memory read instruction and the memory requester 11 is selected. The reserve signal 113-0 reserving an instruction execution start for the instruction execution start control unit associated with the memory requester 10 need only be supplied with a value attained by ANDing in the AND gate gG11 the signal line 1105 of which the value is 1 only when both of the register and the resource are available and the signal line 1102.

When the decoded instruction is a main memory write instruction, the value of the memory requester (1) use request signal 12-1 is 1, and hence the signal lines 1103 and 12-1 are ORed in the gate g9. As a result, the signal line 1104 is set to 1 only when the decoded instruction is a main memory read instruction and the memory requester 11 is selected or only when the decoded instruction is a main memory write instruction. In consequence, the reserve signal 113-1 reserving the instruction execution start for the instruction execution start control unit corresponding to the memory requester 11 need only be loaded with a value obtained by ANDing the signal lines 1104 and 1105.

In a case where the decoded instruction is an add instruction or a multiply instruction, the adder use request signal 12-2 and the multiplier use request signal 12-3 each set to 1, and hence it is only necessary to respectively effect AND operations between the values of the signal lines 12-2 and 12-3 and the value of the signal line 1105 respectively in the AND gates g13 and g14, thereby sending the resultant signals to the reserve signal lines 113-2 and 113-3 reserving instruction execution start operations for the instruction execution control units corresponding to the adder 12 and the multiplier 13, respectively.

The control of the instruction issuance can be achieved as described above.

RESOURCE SELECT CONTROL

The memory requester select operation in a case where the decoded instruction is a main memory read instruction is effected, as described above, by forecasting the points of time when the executions of the instructions held in the respective memory requesters are completed. Furthermore, if the same point of time is forecasted for the memory requesters 10 and 11, the memory requester 10 is selected. This is because if the memory requester 11 is selected and thereafter if the memory requester 11 enters a state where another instruction cannot be held therein, the reservation of the next decoded main memory write instruction becomes impossible.

The forecast methods include as described above: (1) It is forecasted that the execution of an instruction is earlier completed for the resource holding the smaller number of instructions; (2) It is forecasted that when the same number of instructions are held for the resources, the execution of an instruction for which the execution start reserve instruction is earlier issued is to be earlier completed; (3) It is forecasted that when the same number of instructions are held for the resources, the execution of an instruction which earlier enters in execution is to be earlier completed; and (4) It is forecasted that when the same number of instructions are held for the resources, the execution of an instruction having the smaller number of unprocessed vector elements is to be earlier completed.

Next, the respective control methods will be described with reference to FIGS. 9, 10, 11, and 12, respectively.

RESOURCE SELECT CONTROL BY THE NUMBER OF INSTRUCTIONS

Figure 9:
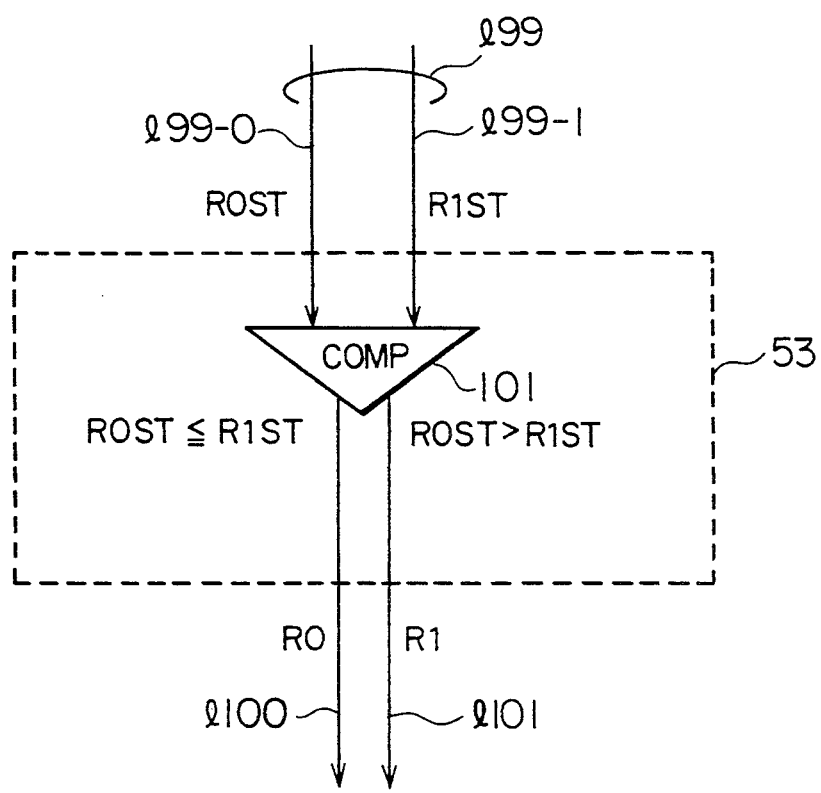
FIG. 9 is a configuration diagram showing a mechanism to select a resource depending on the number of instructions.

FIG. 9 is a circuit diagram of a circuit capable of effecting a resource select operation depending on the number of instructions. In this configuration, a signal line 199 is supplied with the content of the resource reserve state hold register 6. The signal lines 199-0 and 199-1 are supplied with the contents of the memory requester 10 reserve state hold unit 6-0 and the memory requester 11 reserve state hold unit 6-1, respectively. In addition, the signal lines 1100 and 1101 deliver a memory requester (0) select signal and a memory requester (1) select signal, respectively. Reference numeral 101 designates a compare circuit which sends a value of 1 to the signal line 1100 when the value of the signal line 199-0 is not greater than the value of the signal line 199-1 and which outputs a value of 1 to the signal line 1101 when the value of the signal line 199-0 is greater. The signal lines 199-0 and 199-1 are respectively supplied with the numbers of the execution start reserved instructions held in the memory requesters 10 and 11, respectively; consequently, through the control operations above, when the number of the execution start reserved instructions held in the memory requester 10 is greater than that held in the memory requester 11, the memory requester 11 is selected; when the former is smaller, the memory requester 10 is selected; and when these numbers are equal to each other, the memory requester 10 is selected. Resource select control according to point of time of instruction execution start reservation.

Figure 10:
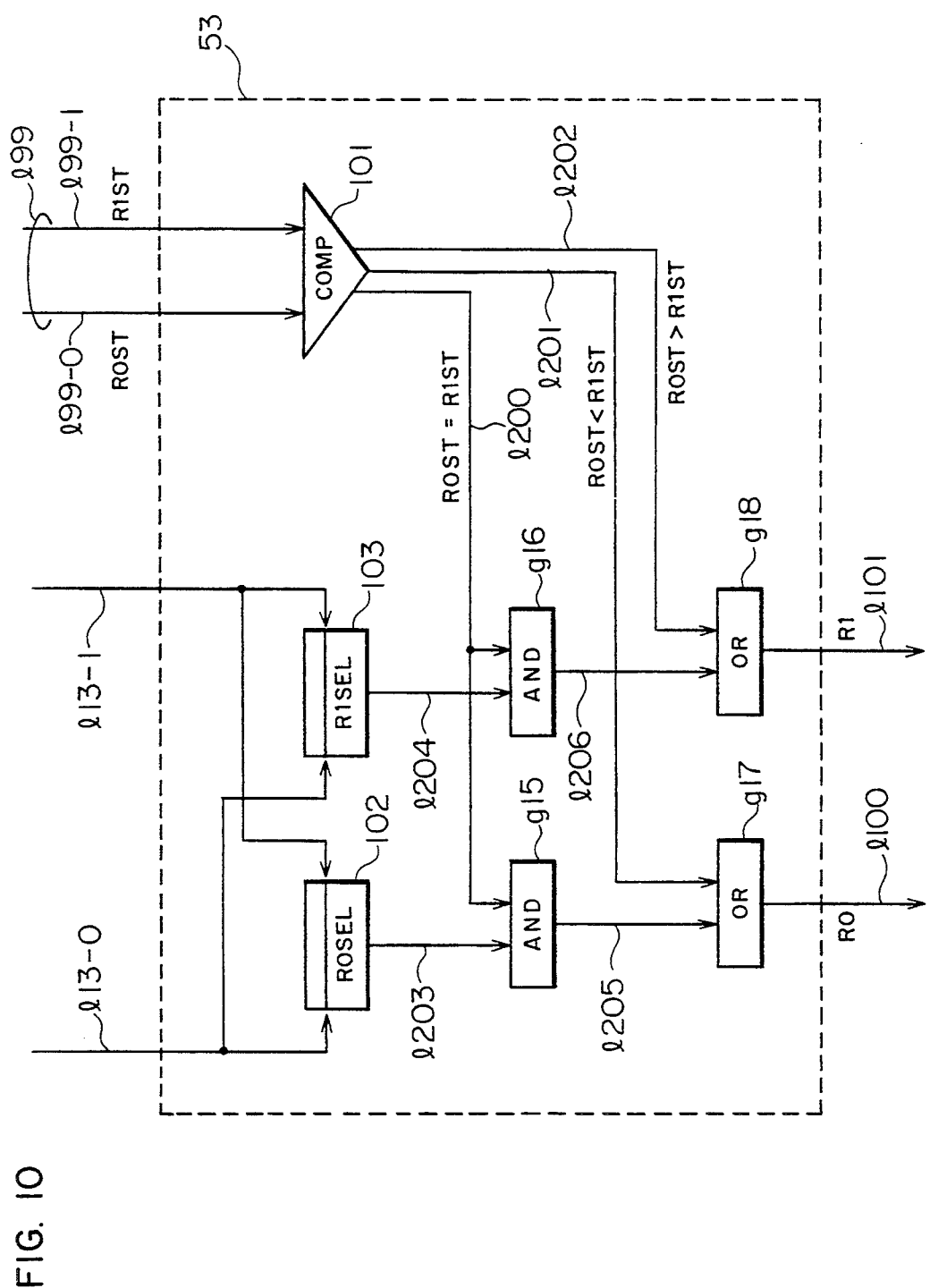
FIG. 10 is a configuration diagram showing a mechanism to select a resource depending on the time when an instruction execution start reservation is instructed.

FIG. 10 shows a circuit capable of achieving a resource select operation depending on the point of time when an instruction execution start is reserved. The signal lines 199, 1100, and 1101 respectively deliver the signals having the same reference numerals as shown in the configuration of FIG. 9. The signal line 113 feeds an instruction execution start reserve signal of FIG. 8, the line 113-0 supplies a reserve signal related to the memory requester 10, and the line 113-1 delivers a reserve signal related to the memory requester 11.

Reference numerals 102 (R0SEL) and 103 (R1SEL) are a memory requester (0) select indication register and a memory requester (1) select indication register, respectively. Each of these selecters indicates, when loaded with a value of 1, that the corresponding memory requester is being selected. The signal lines 113-0 and 113-1 function, when supplied with a value of 1 thereon, as reset signals for the select indication registers 102 and 103 and as set signals for the select indication registers 102 and 103, respectively. Since the signal line 113 is set to 1 when an instruction execution start is to be reserved, by effecting the control operation above, a value of 0 is set to a select indication register corresponding to the memory requester for which the latest reservation is indicated and a value of 1 is set to the other select indication registers, thereby transmitting the pertinent values to the signal lines 1203 and 1204.

Reference numeral 101 is a circuit to compare the value of the signal line 199-0 and that of the signal line 199-1, namely, effects a comparison between the numbers of instructions held in the memory requesters 10 and 11. When the numbers of instructions are equal to each other, a value of 1 is supplied to the signal line 1200; when the number of instructions held in the memory requester 10 is smaller than that held in the memory requester 11, a value of 1 is set to the signal line 1201, and when the number of instructions held in the memory requester 10 is smaller, a value of 1 is set to the signal line 1202.

The values of the signal lines 1203 and 1204 are respectively ANDed with the value of the signal line 1200 by means of the AND gates g15 and g16, respectively so as to transmit the ANDed results to the signal lines 1205 and 1206, respectively. The values of the signal lines 1205 and 1206 are supplied to the OR gates g17 and g18 and are then ORed with the signal lines 1201 and 1202, respectively, thereby sending the resultant signals to the signal lines 1100 and 1101, respectively. According to this circuit, when the number of instructions held in the memory requester 10 is less than that held in the requester 11, a value of 1 is fed to the signal line 1100; when the former is greater, a value of 1 is delivered to the signal line 1101; and when these numbers are equal to each other, a value of 1 is supplied to the signal line 1100 or 1101 corresponding to the requester other than the requester for which the latest indication of the instruction execution start is issued.

RESOURCE SELECT CONTROL DEPENDING ON POINT OF TIME FOR STARTING INSTRUCTION EXECUTION

Figure 11:
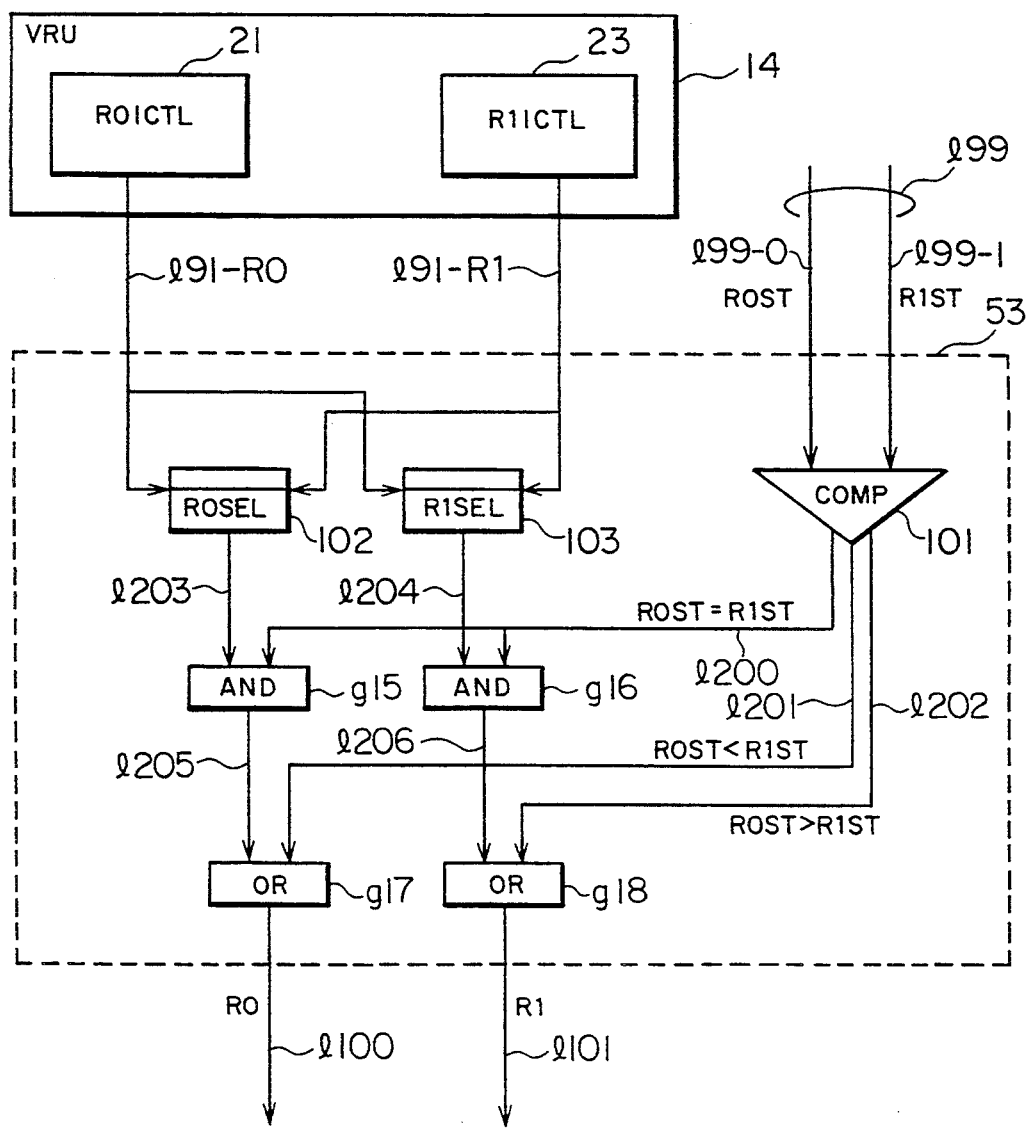
FIG. 11 is a configuration diagram showing a mechanism to select a resource depending on the execution start of an instruction currently being executed in a memory requester.

FIG. 11 shows a circuit which selects a resource according to a point of time for an execution start of an instruction currently being executed in each memory requester.

In this configuration, reference numerals 21 (R0ICTL) and 23 (R1ICTL) indicate instruction execution start control units disposed in the vector register unit 14 corresponding to the memory requesters 10 and 11, respectively. The operations of these control units 21 and 23 are the same as those of the instruction execution start control unit corresponding to the adder 12 of FIG. 3. Signal lines 191-R0 and 191-R1 respectively deliver signals associated with the signal line 191-A of FIG. 3 which are outputted when an instruction being executed in each resource is to be changed over.

Reference numerals 102 and 103 indicate a memory requester (0) select indication register and a memory requester (1) select indication register, respectively; whereas the signal lines 191-R0 and 191-R1 function, when each loaded with a value of 1, as reset signals for the select indication registers 102 and 103 and as set signals for the select indication registers 103 and 102, respectively. The signal line 191 supplies a signal which is set to 1 when an execution of an instruction held in a resource corresponding thereto is to be started, and hence, by the control above, a value of 0 is set to the select indication register corresponding to the memory requester for which an instruction execution is latest effected; whereas a value of 1 is set to the select indication register corresponding to the other memory requester.

The other circuits in FIG. 11 effect the same operations as those of the corresponding circuits of FIG. 10.

According to the operations above, when the number of execution start reserved instructions held in the memory requester 10 is different from that held in the memory requester 11, the memory requester having the smaller number of execution start reserved instructions is selected; and when these numbers are identical to each other, the memory requester for which the instruction execution is to be earlier started is selected, thereby transmitting a value of 1 to the associated signal line 1100 or 1101.

RESOURCE SELECT CONTROL DEPENDING ON NUMBER OF UNPROCESSED VECTOR ELEMENTS

Figure 12:
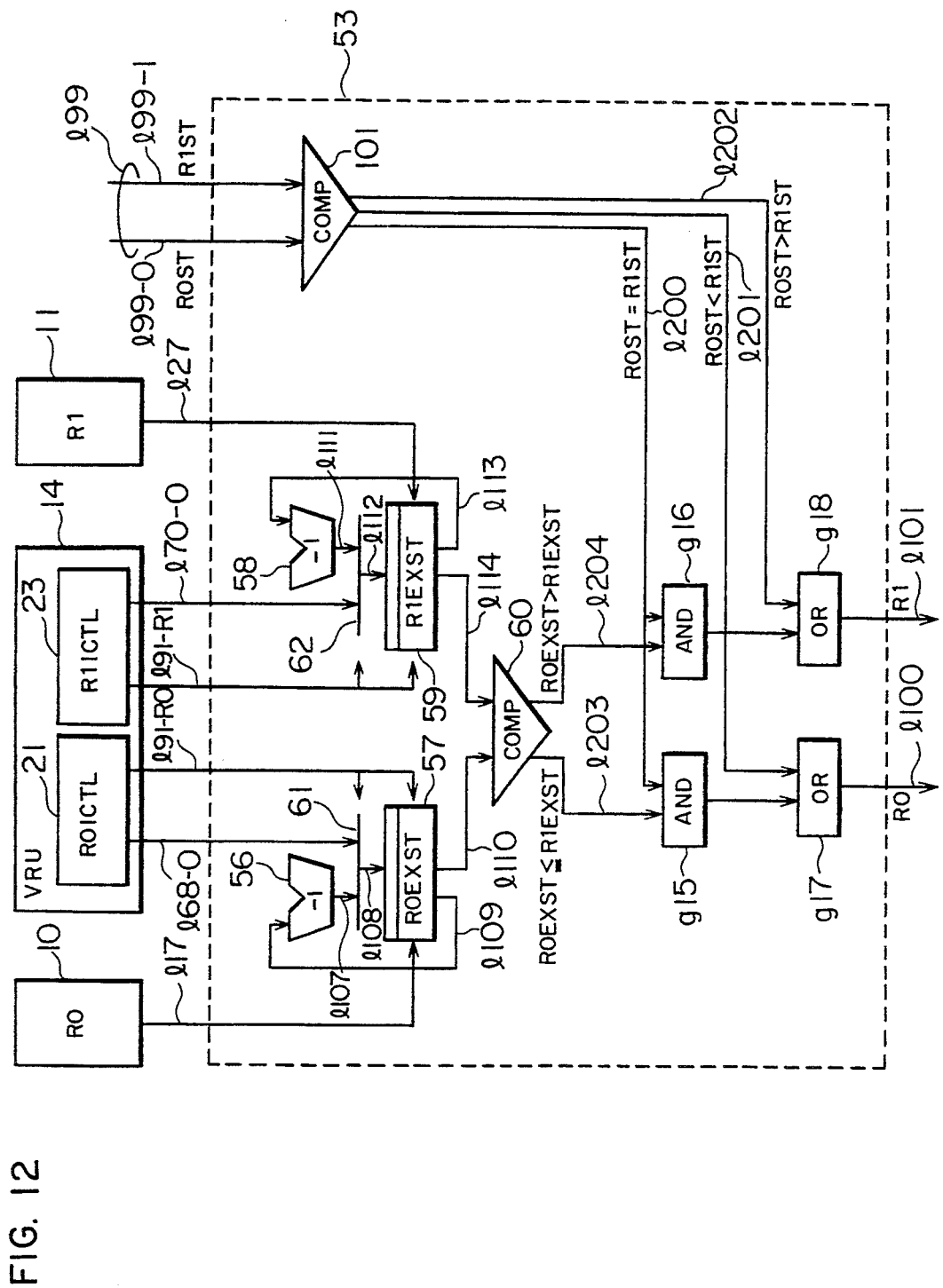
FIG. 12 is a configuration diagram showing a mechanism to select a resource depending on the forecast of the point of time when each instruction execution is completed.

FIG. 12 shows a circuit in which the processing state of an instruction being executed in a memory requester is represented in terms of a vector element level so as to predict the point of time of the completion of the instruction execution, thereby selecting a resource.

In this configuration, reference numerals 21 and 23 denote instruction execution start control units corresponding to the memory requesters 10 and 11, respectively. The operations of these control units 21 and 23 are the same as those developed by the instruction execution start control unit associated with the adder 12 of FIG. 3. The signal lines 191-R0 and 191-R1 respectively correspond to the signal line 191-A of FIG. 3 so as to deliver a control signal to change over an instruction being executed in the respective resources. In addition, the signal lines 168-0 and 170-0 respectively correspond to the signal line 172 of FIG. 3 so as to deliver the decoded information of an instruction to be changed over in response to the control signals 191-R0 and 191-R1. Particularly, the signal lines 168-0 and 170-0 hold the vector length selected from the decoded information of the instruction.

In FIG. 12, reference numerals 57 and 59 are registers to hold the processing states of the instructions being executed in the memory requesters 10 and 11, respectively. More concretely, each of these registers holds the number of the unprocessed vector elements among all the vector elements for which addresses in the main memory are to be transmitted in the instruction being executed.

Next, the control method of the operation above will be described. For a switching operation of an instruction to be executed, the selectors 61 and 62 are respectively changed over under control of the signal lines 191-R0 and 191-R1 such that the vector length of the instruction to be executed is set via the signal lines 168-0 and 1108 or 170-0 and 1112 to the processing state hold registers 57 and 59. The values loaded in the processing state hold registers 57 and 59 are sent via the signal lines 1109 and 1113 to the subtractor 56 and 58, respectively such that the values respectively obtained by subtracting one from the contents of the processing state hold registers 57 (R0EXT) and 59 (R1EXT) are transmitted via the signal lines 1107 and 1111, respectively.

The selectors 61 and 62 select, when values of the signal lines 191-R0 and 191-R1 are 0, the values of the signal lines 1107 and 1111 so as to send these values of the signal lines 1108 and 1112, respectively; whereas, only when values of the valid signals 117 and 127 associated with the addresses transmitted from the memory requesters 10 and 11 are 1, the values of the signal lines 1107 and 1111 are set to the processing state hold registers 57 and 59, respectively.

As a result of the control operation above, the signal lines 1111 and 1114 are respectively loaded with the numbers of unprocessed vector elements of the instructions being executed in the memory requesters 10 and 11, respectively such that when the value of the signal line 1110 is not greater than that of the signal line 1114, a value of 1 is sent to the signal line 1203 and when the value of the signal line 1110 is greater, a value of 1 is transmitted to the signal line 1204.

In the configuration of FIG. 12, the other circuits effect the same operations as those developed by the corresponding circuits of FIG. 10.

Through the operations above, when the different numbers of execution start reserved instructions are respectively held in the memory requesters 10 and 11, the memory requester having the smaller number of execution start reserved instructions is selected, and when the same number thereof is held in the memory requesters 10 and 11, the memory requester having the smaller number of unprocessed vector elements is selected, thereby supplying a value of 1 to the corresponding signal line 1100 or 1101.

While particular embodiments of the invention have been shown and described, it will be obvious to those skilled in the art that various changes and modifications may be made without departing from the present invention in its broader aspects.

We claim:

1. A data processor comprising:
   (a) a plurality of resource means, each of the resource means being responsive to execution start of an instruction executable thereby among a set of instructions to be executed by the data processor, for executing a sequence of processing required by the instruction on a set of vector elements required by the instruction, each of the resource means including a plurality of pipelined stages for executing a sequence of processing on a succeeding vector element in parallel to execution of the sequence on a preceding vector element; and
   (b) a plurality of execution start control means, each of the execution start control means being provided for a corresponding one of the plurality of resource means, for controlling start of execution of instructions executable by said corresponding resource means, among said set of instructions, each of the execution start control means including:
      (b1) instruction holding means for holding at least one succeeding instruction to be executed after a preceding instruction being executed by said corresponding resource means, and
      (b2) start means for starting execution of the succeeding instruction held by the instruction holding means;
   (c) instruction transfer means provided in common to said plurality of execution start control means for transferring each of the instructions to be executed by said data processor selectively to said instruction holding means provided within one of said plurality of execution start control means corresponding to one of said plurality of resource means which can execute the instruction, in parallel to execution of a preceding instruction by said one resource means;
   (d) a plurality of vector registers each of said vector registers for holding a set of vector elements, each of said vector registers being connected to said plurality of resource means so as to provide a set of vector elements held by said vector register to one of said plurality of resource means or so as to receive a set of vector elements supplied by one of said plurality of resource means; and (e) a vector register control circuit connected to said plurality of execution start control means and responsive to an instruction whose execution has been started by one of said plurality of execution start control means for supplying a series of read requests to one of said vector registers requested by said instruction, so that a set of vector elements are sequentially read out from said one vector register and are sequentially supplied to one of said plurality of resource means corresponding to said one execution start control means, said vector register control circuit including requesting means operating in synchronism with supply of a last one of the series of the read requests for requesting said start means included within said one execution start control means to start execution of a succeeding instruction held in said instruction holding means within said one execution start control means.

2. A data processor according to claim 1, wherein said instruction transfer means includes means for transferring instructions to said plurality of execution start control means so that an instruction executable by one of said plurality of resource means is transferred to execution start control means corresponding to said one resource means under a condition that a vector register requested by the instruction is available for use without determining the availability of resource means required by the instruction, including judge means for judging availability of the vector register depending upon usage status thereof by instructions being executed by the plurality of resource means and by instructions held by said plurality of execution start control means.

3. A data processor according to claim 2, wherein each of the execution start control means includes means, responsive to a request by said vector register control circuit for selecting, as an instruction to be started, a succeeding instruction held thereby if there is any, and responsive to transfer of an instruction thereto from said instruction transfer means for selecting the transferred instruction when there is no instruction either being executed by corresponding resource means or being held by said execution start control means so as to start execution of the selected instruction.

4. A data processor according to claim 2, wherein said plurality of resource means includes first and second resource means which can execute a same predetermined instruction; and wherein said instruction transfer means includes select means for selecting, when an instruction to be transferred is the predetermined instruction, one of the first and second resource means for which a forecast timing of completion of execution of processing by one of said first and second resource means for instructions already occupying said one resource means is earlier than for another of the first and second resource means and for transferring the predetermined instruction to the selected resource means, the instructions already occupying the resource means including an instruction being executed thereby and an instruction being held by execution start control means corresponding thereto.

5. A data processor according to claim 1, wherein said requesting means executes the requesting at a time which enables said vector register control circuit to start, in response to starting of execution of said succeeding instruction by said one execution start control means, supplying of a series of read requests to a vector register required by said succeeding instruction at a clock timing next to a clock timing at which said vector register control circuit supplies the last one of the series of read requests for said preceding instruction.

6. A data processor comprising:

(a) a plurality of resource means, each of said resource means being responsive to execution start of an instruction executable thereby among a set of instructions to be executed by the data processor, for executing a sequence of processing required by the instruction, wherein said plurality of resource means includes first and second resource means both of which can execute a same predetermined instruction;

(b) a plurality of execution start control means, each of the execution start control means being provided for a corresponding one of the plurality of resource means, for controlling start of execution of instructions executable by said corresponding resource means, among the set of instructions, each of said execution start control means including:

(b1) instruction holding means for holding at least one succeeding instruction to be executed after a preceding instruction being executed by said corresponding resource means; and (b2) start means for starting execution of a succeeding instruction held by the instruction holding means at a timing dependent upon execution of a sequence of processing by said corresponding resource means on a preceding set of vector elements requested by the preceding instruction;

(c) instruction transfer means connected to said plurality of execution start control means for transferring instructions thereto so that an instruction executable by one of said plurality of resource means is transferred to execution start control means corresponding to said one resource means, said instruction transfer means including select means for selecting one of the first and second resource means for which a forecast timing completion of execution of processing by the resource means for instructions already occupying the resource means is earlier than for the other of the first and second resource means so as to transfer the predetermined instruction to the selected resource means, the instructions already occupying the resource means including an instruction being executed thereby and an instruction being held by execution start control means corresponding thereto.

7. A data processor according to claim 6, further comprising:

a plurality of vector registers each for holding a set of vector elements;

vector register control means connected to said vector registers, said plurality of resource means and said plurality of execution start control means and responsive to an instruction execution started by one of said plurality of execution start control means for performing at least one of first and second operations, wherein during the first operation a set of vector elements are sequentially read and supplied from one of said vector registers requested by the instruction to one of said plurality of resource means which can execute the instruction, and during the second operation a set of vector elements supplied by said one resource means are sequentially written into one of the vector registers; and wherein each resource means includes a plurality of pipelined stages for executing a sequence of processing on a succeeding vector element in parallel to execution of the sequence on a preceding vector element.

8. A data processor according to claim 7, wherein said select means includes means for selecting one of the first and second resource means depending upon a total number of vector elements which are not yet processed for an instruction being executed by the first resource means and a total number of vector elements which are not yet processed for an instruction being executed by the second resource means.

9. A data processor according to claim 7, wherein said select means includes means for selecting one of the first and second resource means depending upon a total number of instructions already occupying the first resource means and a total number of instructions already occupying the second resource means.

10. A data processor according to claim 7, wherein said select means includes means for selecting one of the first and second resource means depending upon a transfer timing of an instruction most recently transferred to said first resource means among instructions occupying the first resource means and a transfer timing of an instruction most recently transferred to said second resource means among instructions occupying the second resource means.

11. A data processor according to claim 7, wherein said select means includes means for selecting one of the first and second resource means depending upon an execution start timing of an instruction being executed by the first resource means and an execution start timing of an instruction being executed by the second resource means.

12. A data processor according to claim 7, wherein:
said first resource means includes means for executing more kinds of instructions than said second resource means; and
said select means further includes means for selecting the first resource means when the forecast timing of completion of processing by the first resource means is substantially the same as one by the second resource means.

13. A data processor according to claim 6, wherein said select means includes means for selecting one of the first and second resource means depending upon a total number of instructions already occupying the first resource means and a total number of instructions already occupying the second resource means.

14. A data processor according to claim 6, wherein said select means includes means for selecting one of the first and second resource means depending upon a transfer timing of an instruction most recently transferred to said first resource means among instructions occupying the first resource means and a transfer timing of an instruction most recently transferred to said second resource means among instructions occupying the second resource means.

15. A data processor according to claim 6, wherein said select means includes means for selecting one of the first and second resource means depending upon an execution start timing of an instruction being executed by the first resource means and an execution start timing of an instruction being executed by the second resource means.

16. A data processor according to claim 6, wherein:
said first resource means includes means for executing more kinds of instructions than said second resource means; and
said select means further includes means for selecting the first resource means when the forecast timing of completion of processing for the first resource means is substantially the same as one for the second resource means.

17. A data processor comprising:
a plurality of resources for executing instructions;
a plurality of instruction hold means corresponding to said resources, each of said plurality of instruction hold means holds instructions to be executed in a corresponding one of said resources;
a plurality of execution start control means corresponding to said resources, each of said plurality of execution start control means independently causing a start of execution of a succeeding instruction, held in one of said plurality of instruction hold means corresponding to a particular one of said resources to which said each execution start control means corresponds, before the particular resource completes execution of a preceding instruction, execution of said preceding instruction having been already started by said each execution start control means; and
instruction control means connected to said plurality of instruction hold means for transferring a series of instructions to be executed by said data processor to said plurality of instruction hold means, so that each of said instructions is transferred to one of said plurality of instruction hold means which is provided in correspondence to one of said plurality of resources which can execute said each instruction.

18. A data processor according to claim 17, wherein each of said resources includes means for processing vector data specified by an instruction transferred from said instruction control means.

19. A data processor according to claim 17, further comprising a plurality of registers connected to said plurality of resources, wherein:
said instruction control means includes means for judging whether or not one of said registers to be used by an instruction to be transferred is available and whether or not the instruction hold means corresponding to said particular resource can hold a further instruction and for transferring, in a case where a result of the judgement is positive, the further instruction to the instruction hold means corresponding to the particular resource.

20. A data processor according to claim 19, wherein:
each of said registers is a vector register for holding vector data; and
each of said resources includes means for processing either vector data read from a particular vector register specified by a particular instruction transferred from said instruction control means or vector data to be written in said particular register specified by the particular instruction.

21. A data processor according to claim 17, further comprising means for forecasting points in time respectively corresponding to completions of executions of instructions currently held in said instruction hold means corresponding to each resource in order to select a resource in which an execution of an instruction currently held in said instruction hold means is first completed;

wherein:

at least two of said resources are capable of executing the same instruction; and said instruction control means transfers, in a case where a particular instruction to be transferred can be executed in any one of said at least two resources, the particular instruction to the instruction hold means corresponding to said selected resource.

22. A data processor according to claim 21, wherein said forecasting means includes means for forecasting a point of time of execution completion for said instructions depending on numbers of instructions respectively held in said instruction hold means.

23. A data processor according to claim 21, wherein said forecasting means includes means for forecasting a point of time of execution completion for said instructions depending on points of time when said instruction control means respectively transfer last instructions to said instruction hold means.

24. A data processor according to claim 21, wherein said forecasting means includes means for forecasting a point of time of execution completion for said instructions depending on points of time when instructions respectively being executed in said resources are started for execution.

25. A data processor according to claim 21, wherein:

the instructions to be executed include a vector instruction for processing vector data including a plurality of vector elements; and said forecasting means includes means for forecasting a point of time of execution completion for each instruction depending on numbers of vector elements remaining to be respectively processed by instructions being executed in said resources.

26. A data processor according to claim 21, wherein:

in said plurality of resources, a first resource is capable of executing instructions of a first kind and a second kind, and a second resource is capable of executing instructions of the first kind and is not capable of executing instructions of the second kind; and said forecasting means includes means for selecting the second resource in a case where it is forecasted that points of time for an instruction execution completion in the first and second resources is the same.

27. A data processor comprising:

a plurality of resources for executing instructions, said each resource having pipelined stages for executing a sequence of processing required by an instruction in an overlapped manner;

a plurality of instruction hold means corresponding to said resources, each of said plurality of instruction hold means holds instructions to be executed in a corresponding one of said resources;

a plurality of execution start control means corresponding to said resources, each of said plurality of execution start control means independently causing a start of execution of a succeeding instruction, held in one of said plurality of instruction hold means corresponding to a particular one of said resources to which said each execution start control means corresponds, at a timing dependent upon execution of a sequence of processing required by a preceding instruction on said particular resource, execution of said preceding instruction having been already started by said each execution start control means; and instruction control means connected to said plurality of instruction hold means for transferring a series of instructions to be executed by said data processor to said plurality of instruction hold means, so that each of said instructions is transferred to one of said plurality of instruction hold means which is provided in correspondence to one of said plurality of resources which can execute said each instruction.

* * * * *